US010202108B2

(12) United States Patent
Misunou et al.

(10) Patent No.: US 10,202,108 B2
(45) Date of Patent: Feb. 12, 2019

(54) BRAKE APPARATUS AND BRAKE SYSTEM

(71) Applicant: HITACHI AUTOMOTIVE SYSTEMS, LTD., Hitachinaka-shi, Ibaraki (JP)

(72) Inventors: Masaki Misunou, Atsugi (JP); Ryohei Maruo, Kawasaki (JP); Chiharu Nakazawa, Kawasaki (JP)

(73) Assignee: HITACHI AUTOMOTIVE SYSTEMS, LTD., Hitachinaka-Shi (JP)

( * ) Notice: Subject to any disclaimer, the term of this patent is extended or adjusted under 35 U.S.C. 154(b) by 78 days.

(21) Appl. No.: 14/774,553

(22) PCT Filed: May 21, 2014

(86) PCT No.: PCT/JP2014/063421
§ 371 (c)(1),
(2) Date: Sep. 10, 2015

(87) PCT Pub. No.: WO2014/189066
PCT Pub. Date: Nov. 27, 2014

(65) Prior Publication Data
US 2016/0031425 A1 Feb. 4, 2016

(30) Foreign Application Priority Data
May 24, 2013 (JP) .................................. 2013-109634

(51) Int. Cl.
*B60T 8/40* (2006.01)
*B60T 7/04* (2006.01)
(Continued)

(52) U.S. Cl.
CPC ............ *B60T 8/4086* (2013.01); *B60T 7/042* (2013.01); *B60T 8/368* (2013.01); *B60T 8/4081* (2013.01);
(Continued)

(58) Field of Classification Search
CPC ...... B60T 8/4081; B60T 8/4086; B60T 8/409; B60T 8/4077
See application file for complete search history.

(56) References Cited

U.S. PATENT DOCUMENTS 4,326,379 A 4/1982 Dauvergne
6,464,307 B1 10/2002 Yoshino
(Continued)

FOREIGN PATENT DOCUMENTS

JP S64-036554 A 2/1989
JP 2001-213295 A 8/2001
(Continued)

OTHER PUBLICATIONS

JP 2005239001A machine translation to English. 2005.*
(Continued)

Primary Examiner — F. Daniel Lopez
Assistant Examiner — Michael Quandt
(74) Attorney, Agent, or Firm — Foley & Lardner LLP

(57) ABSTRACT

A brake apparatus improved in mountability on a vehicle is provided. The apparatus includes a master cylinder 4 that generates hydraulic brake pressure by a driver's brake operation, and a stroke simulator 5 that creates an artificial operation reaction force of a brake operation member when the brake fluid flown out of the master cylinder 4 enters the stroke simulator 5. The master cylinder 4 and the stroke simulator 5 are integrally arranged to overlap each other in a perpendicular direction (as viewed from the perpendicular direction) when installed in the vehicle.

6 Claims, 8 Drawing Sheets

(51) Int. Cl.
  *B60T 13/14* (2006.01)
  *B60T 17/02* (2006.01)
  *B60T 8/36* (2006.01)
  *B60T 11/22* (2006.01)
  *B60T 11/228* (2006.01)
  *B60T 11/20* (2006.01)

(52) U.S. Cl.
  CPC .............. *B60T 11/20* (2013.01); *B60T 11/22* (2013.01); *B60T 11/228* (2013.01); *B60T 13/142* (2013.01); *B60T 17/02* (2013.01); *B60T 8/3685* (2013.01)

(56) References Cited

U.S. PATENT DOCUMENTS

| 7,032,982 | B2 * | 4/2006 | Ogiwara | B60T 8/4081 |
| | | | | 303/114.1 |
| 2005/0067885 | A1 | 3/2005 | Ogiwara et al. | |
| 2013/0232967 | A1 | 9/2013 | Murayama et al. | |

FOREIGN PATENT DOCUMENTS

| JP | 2005-104334 A | | 4/2005 |
| JP | 2005239001 A | * | 9/2005 |
| JP | 2006-151220 A | | 6/2006 |
| JP | 2007176277 A | * | 7/2007 |
| JP | 2007-203891 A | | 8/2007 |
| JP | 2008-238834 A | | 10/2008 |
| JP | 2012-106638 A | | 6/2012 |
| WO | WO-99/39956 A1 | | 8/1999 |

OTHER PUBLICATIONS

JP 2007176277A machine translation to English. 2007.*
Misunou: Non-Final Office Action for U.S. Appl. No. 14/890,486 dated Jan. 12, 2017.
Misunou: Final Office Action for U.S. Appl. No. 14/890,486 dated Aug. 1, 2017.
Misunou: Non-Final Office Action for U.S. Appl. No. 14/890,486 dated May 11, 2018.
Misunou: Final Office Action for U.S. Appl. No. 14/890,486 dated Sep. 28, 2018.

* cited by examiner

BRAKE APPARATUS AND BRAKE SYSTEM

TECHNICAL FIELD

The present invention relates to brake apparatuses.

BACKGROUND ART

Brake apparatuses conventionally known are those for vehicles. In the brake apparatus (input device of a brake system for a vehicle) discussed in Patent Document 1, for example, a stroke simulator is located level with a master cylinder when mounted on a vehicle.

CITATION LIST

Patent Document

Patent Document 1: Japanese Unexamined Patent Application Publication (Kokai) No. 2012-106638

SUMMARY OF INVENTION

Technical Problem

According to conventional brake apparatuses, the area occupied by a brake apparatus is relatively large as viewed from above. It has therefore not been possible to improve mountability of brake apparatuses on vehicles. It is an object of the invention to provide a brake apparatus improved in mountability on a vehicle.

Solution to Problem

To accomplish the object, according to a brake apparatus of the invention, a master cylinder and a stroke simulator lie on top of each other in a vertical direction (as viewed in a vertical direction) when the apparatus is mounted on a vehicle.

Advantageous Effects of Invention

The invention thus improves the mountability of brake apparatuses on vehicles.

DESCRIPTION OF EMBODIMENTS

Modes for carrying out a brake apparatus of the invention will be described below with reference to the attached drawings.

Embodiment 1

Vehicles to which a brake apparatus of the present embodiment is applied are electric vehicles capable of generating a regenerative braking force by using electric motors. The electric vehicles include, for example, hybrid vehicles provided with not only an engine (internal combustion engine) but an electrically-operated motor (generator) as prime movers for driving wheels, and battery vehicles whose only prime mover for driving wheels is a motor (generator). A braking system (brake system) according to the present embodiment is a hydraulic brake system that provides hydraulic brake pressure to each wheel of the vehicle and generates a braking force. Upon receiving hydraulic braking pressure and hydraulic control pressure, a wheel cylinder (caliper) provided to each wheel of the vehicle generates hydraulic brake actuating pressure (wheel-cylinder hydraulic pressure). The brake system includes a brake apparatus 1 serving as an input device into which a driver's brake operation is inputted, and an electric brake actuator (hereinafter, referred to as actuator 8) that is capable of generating hydraulic brake pressure in accordance with an electric signal corresponding to the driver's brake operation. The brake apparatus 1 is actuated by the driver's brake operation and generates master-cylinder hydraulic pressure as hydraulic braking pressure. The actuator 8 is provided independently of the brake apparatus 1 and controls the wheel-cylinder hydraulic pressure (hydraulic brake pressure) according to a brake operating condition or a vehicle condition.

Figure 1:
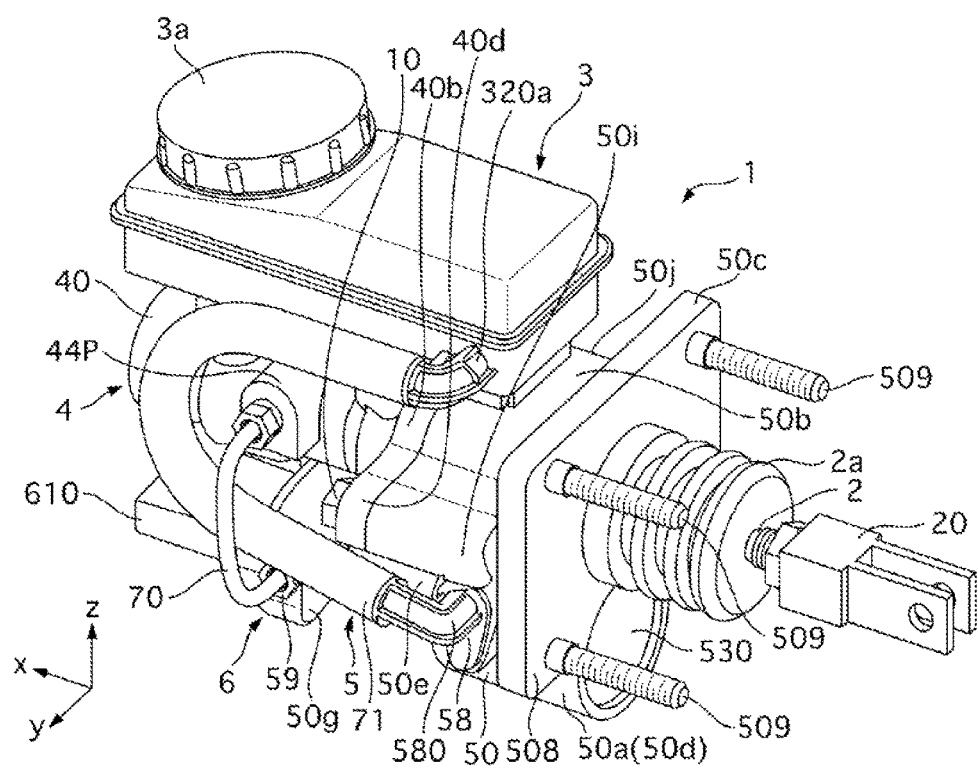
FIG. 1 is a perspective view of a brake apparatus 1 according to an Embodiment 1.
Figure 2:
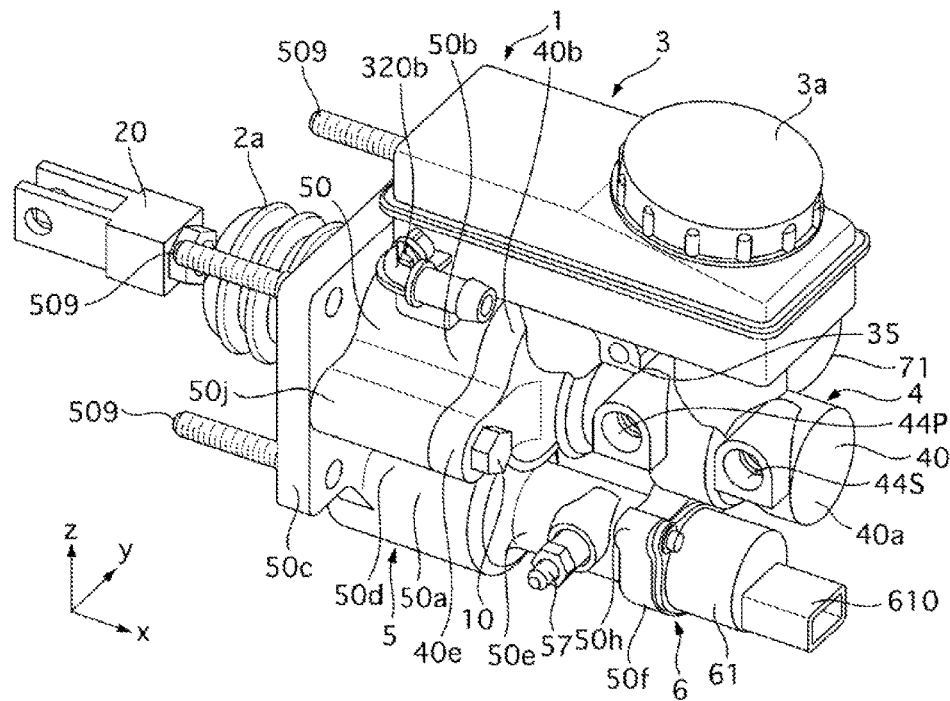
FIG. 2 is a perspective view of the brake apparatus 1 according to the Embodiment 1.
Figure 3:
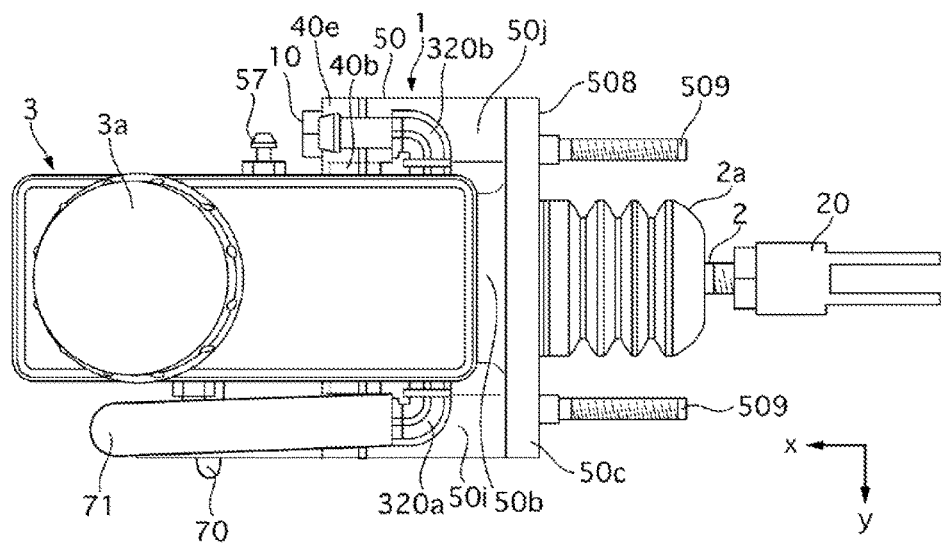
FIG. 3 is a top view of the brake apparatus 1 according to the Embodiment 1.
Figure 4:
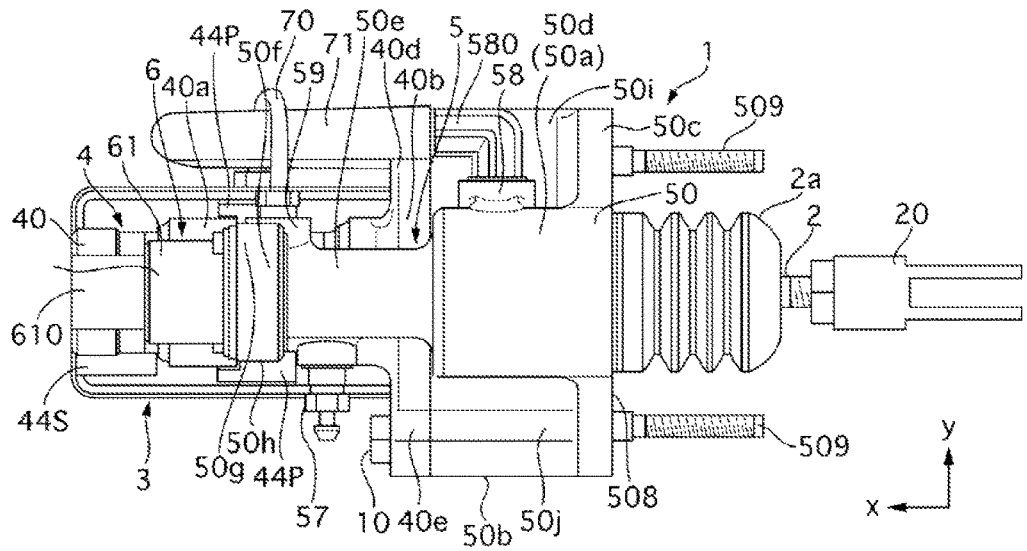
FIG. 4 is a bottom view of the brake apparatus 1 according to the Embodiment 1.
Figure 5:
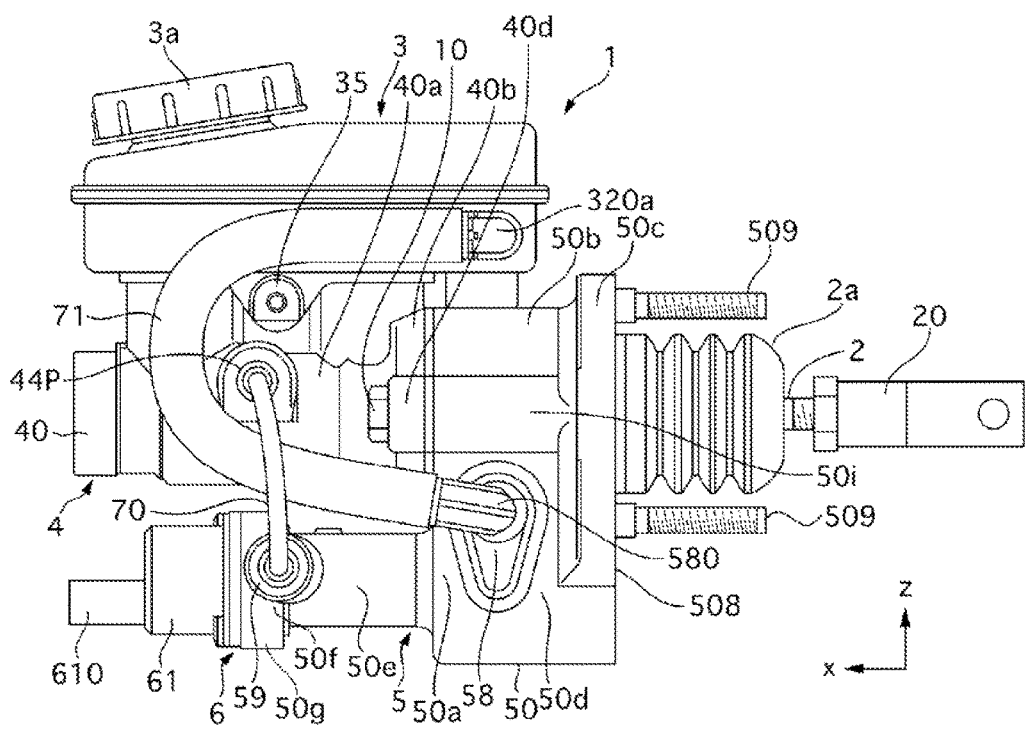
FIG. 5 is a side view of the brake apparatus 1 according to the Embodiment 1.
Figure 6:
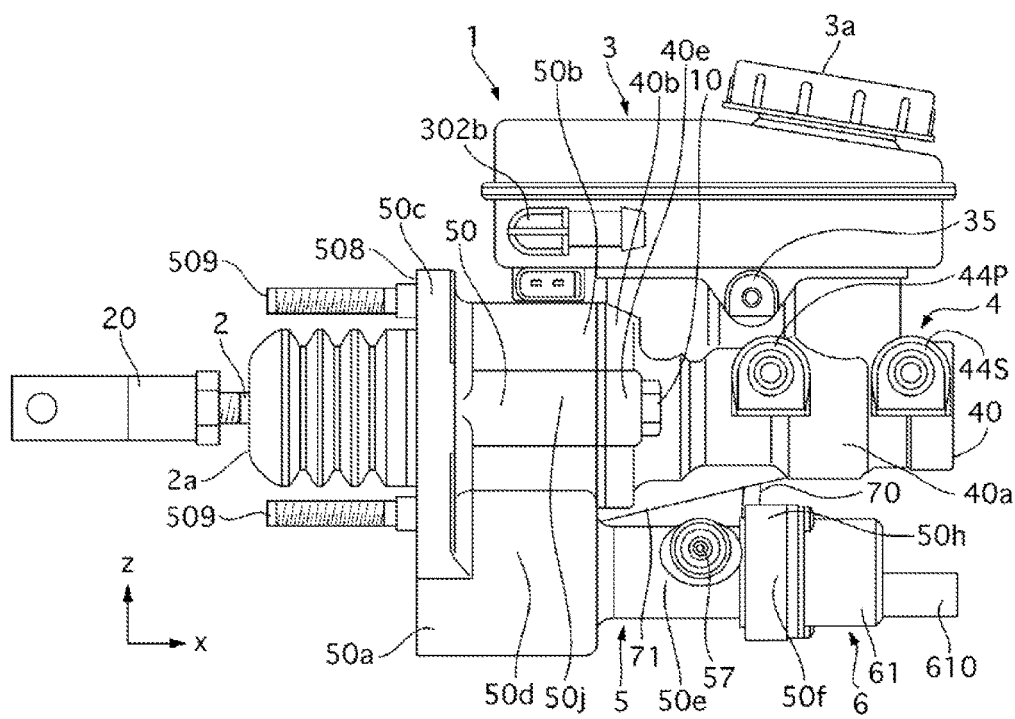
FIG. 6 is a side view of the brake apparatus 1 according to the Embodiment 1.
Figure 7:
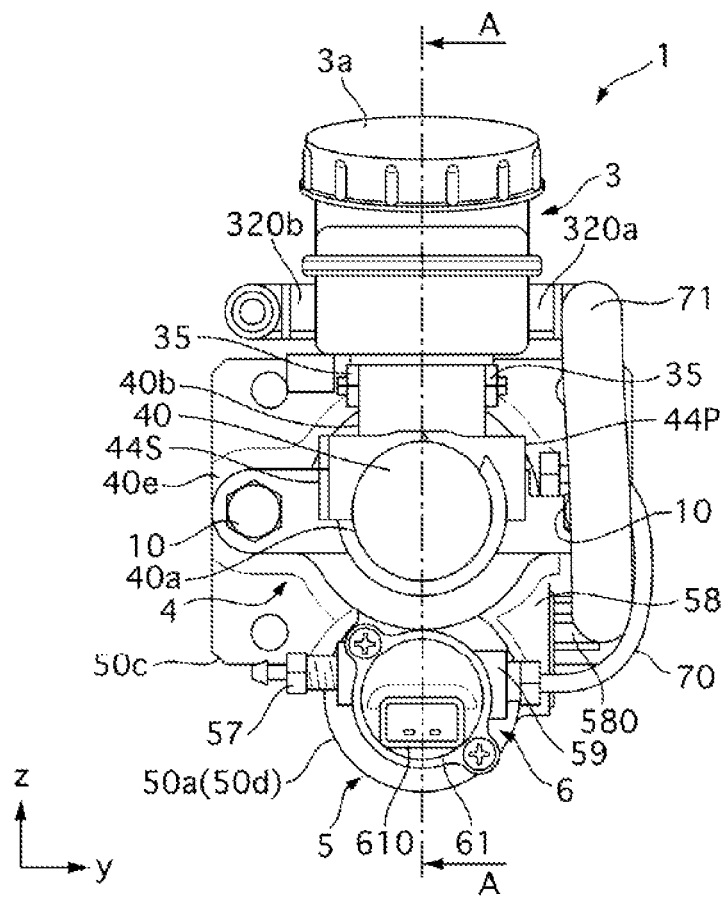
FIG. 7 is a front view of the brake apparatus 1 according to the Embodiment 1.
Figure 8:
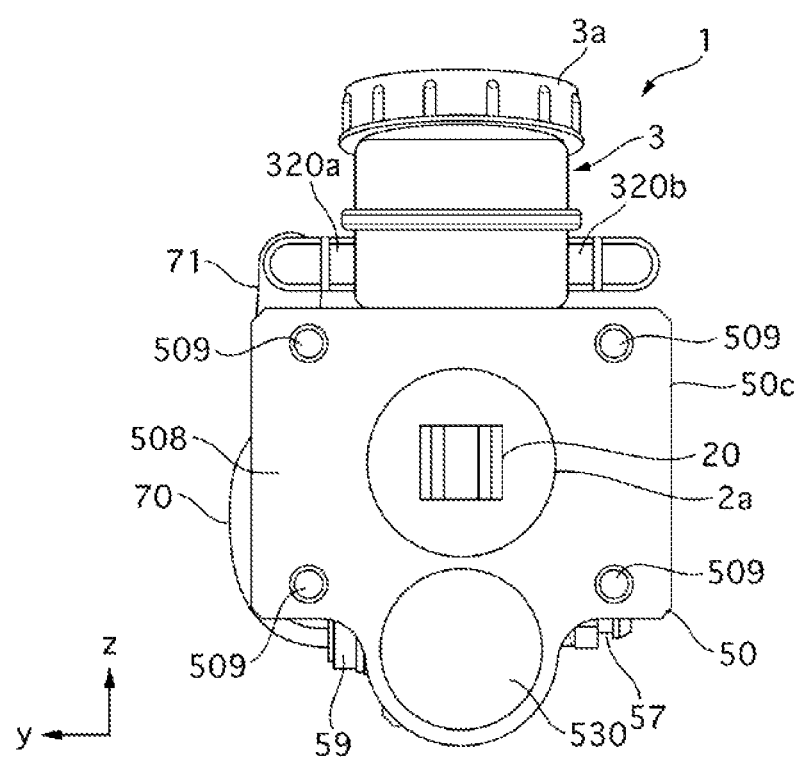
FIG. 8 is a rear view of the brake apparatus 1 according to the Embodiment 1.
Figure 9:
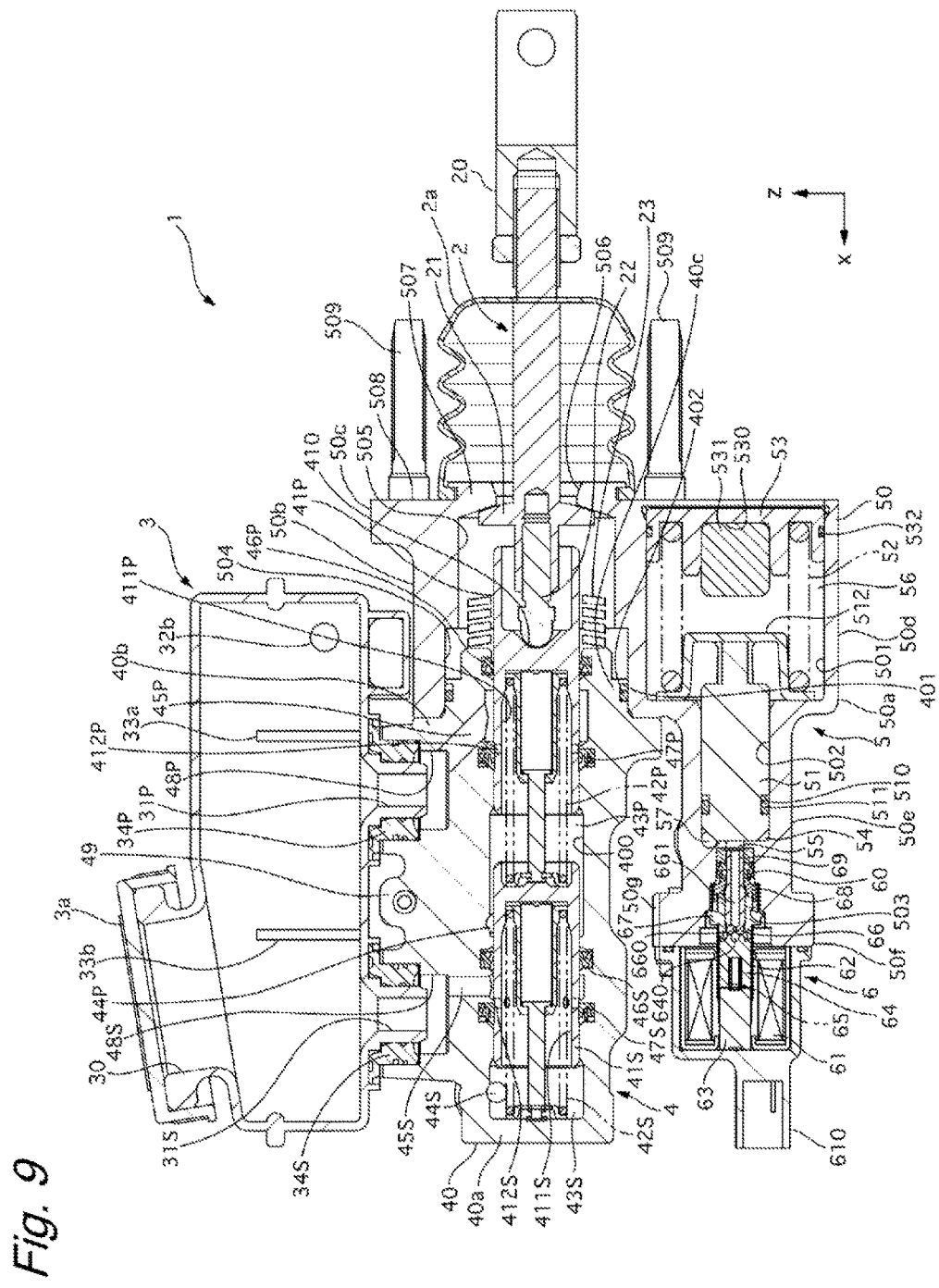
FIG. 9 is a sectional view taken along line A-A of FIG. 7.

FIGS. 1 to 9 show the entire brake apparatus 1 of the present embodiment as viewed from various directions. For convenience of explanation, an orthogonal coordinate system is given to each drawing. An x-axis indicates a front-back direction of the vehicle (axial direction in which a master cylinder 4 operates) in a state where the brake apparatus 1 is installed in the vehicle. An x-axis direction indicates the front-back direction of the vehicle because an axial direction of the master cylinder 4 is substantially parallel to the front-back direction of the vehicle when the brake apparatus 1 is installed in the vehicle. A forward direction of the vehicle (direction in which pistons 41 of the master cylinder 4 strokes according to depression of a brake pedal) is defined as a positive direction of the x-axis. A y-axis indicates a width direction (right-and-left or traverse direction) of the vehicle. A leftward direction as viewed from behind the vehicle (from a negative side of the x-axis) is defined as a positive direction of the y-axis. A z-axis indicates an up-and-down direction (perpendicular direction) of the vehicle. An upward direction of the vehicle (side on which a reservoir tank 3 is situated relative to the master cylinder 4) is defined as a positive direction of the z-axis. FIG. 1 is a perspective view of the brake apparatus 1 viewed from a negative side of the x-axis, the positive side of the y-axis, and the positive side of the z-axis. FIG. 2 is a perspective view of the brake apparatus 1 viewed from the positive side of the x-axis, a negative side of the y-axis, and the positive side of the z-axis. FIG. 3 is a top view of the brake apparatus 1 viewed from the positive side of the z-axis. FIG. 4 is a bottom view of the brake apparatus 1 viewed from a negative side of the z-axis. FIG. 5 is a side view of the brake apparatus 1 viewed from the positive side of the y-axis. FIG. 6 is a side view of the brake apparatus 1 viewed from the negative side of the y-axis. FIG. 7 is a front view of the brake apparatus 1 viewed from the positive side of the x-axis. FIG. 8 is a rear view of the brake apparatus 1 viewed from the negative side of the x-axis. FIG. 9 is a sectional view of the brake apparatus 1 taken along a plane passing through an axis of the master cylinder 4. FIG. 9 is a section along line A-A of FIG. 7, viewed from a direction of arrows of FIG. 7.

The brake apparatus 1 includes a pushrod 2, the reservoir tank 3, the master cylinder 4, a stroke simulator 5, and a stroke simulator valve 6. The brake apparatus 1 is a master cylinder unit which has the master cylinder 4 built in. The brake system has brake piping divided in two systems (primary P-system and secondary S-system). Hereinafter, members and structures corresponding to the P-system and those corresponding to the S-system are respectively provided with letters P and S at the end of reference marks. The pushrod 2 is connected to a brake pedal (not shown) through a device 20. The brake pedal is an input member (brake operation member) that receives input of the driver's brake operation. The pushrod 2 operates in the x-axis direction in conjunction with the brake pedal. The pushrod 2, for example, strokes in the x-axis direction according to depression of the brake pedal. An x-axis positive-side end of the pushrod 2 is in contact with a piston 41P of the master cylinder 4 (see FIG. 9). The pushrod 2 receives the driver's operation force applied to the brake pedal and transmits the force to the master cylinder 4 as a thrust force acting in the x-axis direction. A flange portion 21 is disposed on the x-axis positive side of an outer periphery of the pushrod 2. Fastened to the x-axis positive-side end of the pushrod 2 is a contact member 22 whose tip end on the x-axis positive side is formed in a convex spheroidal shape. The brake apparatus 1 of the present embodiment requires no booster of a type which is interposed between the brake pedal and the master cylinder and operates using intake pressure (negative pressure) generated by the vehicle engine (masterback), as a booster (brake booster) for reducing the driver's braking force required.

The reservoir tank 3 is a brake fluid source in which brake fluid is stored. The reservoir tank 3 supplies the brake fluid to the master cylinder 4 and the actuator 8. The reservoir tank 3 has a feed opening 30, replenishing openings 31P and 31S, and replenishing openings 32*a* and 32*b*. The feed opening 30 opens in the x-axis positive side of the reservoir tank 3 to protrude in the positive direction of the z-axis. A lid 3*a* makes the feed opening 30 closable and openable. The replenishing openings 31P and 31S are arranged side by side in the x-axis direction, and protrude from the reservoir tank 3 in the negative direction of the z-axis to open in the master cylinder 4 side of the reservoir tank 3. The replenishing opening 31P is situated further on the negative side of the x-axis than the replenishing opening 31S. The replenishing openings 32*a* and 32*b* are situated further on the negative side of the x-axis than the replenishing opening 31P, and open in their respective y-axial side faces of the reservoir tank 3 in the y-axis direction. A fastening portion 35 is situated on the z-axis negative side of the reservoir tank 3 to be located between the replenishing openings 31P and 31S. In the fastening portion 35, there is formed a hole extending in the y-axis direction, into which a pin for fastening the reservoir tank 3 to the master cylinder 4 is to be inserted. Inside the reservoir tank 3, two partition plates 33*a* and 33*b* are placed to extend in the positive direction of the z-axis from a bottom face on the z-axis negative side. The two partition plates 33*a* and 33*b* divide the inside of the reservoir tank 3 into three areas. The area located on the x-axis positive side is provided with the replenishing opening 31S. The area located on the x-axis negative side is provided with the replenishing openings 32*a* and 32*b*. The area sandwiched between the foregoing two areas is provided with the replenishing opening 31P. The replenishing opening 31S, the replenishing openings 32*a* and 32*b*, and the replenishing opening 31P each have an opening portion. The partition plates 33 make it possible to retain the brake fluid in each area, for example, even if the vehicle inclines or is accelerated or decelerated. The partition plates 33 thus enable replenishment of the brake fluid through each replenishing opening. Connected to the replenishing opening 32*a* is a pipe attachment portion 320*a* (see FIG. 1). The pipe attachment portion 320*a* is attached with one end of a brake pipe 71. The pipe attachment portion 320*a* protrudes from the x-axis negative side, y-axis positive side, and z-axis negative side of an outer face of the reservoir tank 3 in the positive direction of the y-axis, and then bends in the positive direction of the x-axis. A tip end of the pipe attachment portion 320*a*, to which the brake pipe 71 is attached, opens on the x-axis positive side. Connected to the replenishing opening 32*b* is a pipe attachment portion 320*b* (see FIG. 2). The pipe attachment portion 320*b* is attached with one end of another brake pipe. The pipe attachment portion 320*b* protrudes from the x-axis negative side, y-axis negative side, and z-axis negative side of an outer face of the reservoir tank 3 in the negative direction of the y-axis, and then bends in the positive direction of the x-axis. A tip end of the pipe attachment portion 320*b* to which the brake pipe is attached opens in the positive direction of the x-axis.

The master cylinder 4 is a first brake-fluid pressure source which generates hydraulic pressure (master-cylinder hydraulic pressure) according to a brake pedal operation (brake operation) by the driver. The master cylinder 4 is connected through fluid paths (brake pipes) (not shown) to wheel cylinders. The master-cylinder hydraulic pressure is supplied through the fluid paths to the wheel cylinders to generate the wheel-cylinder hydraulic pressure. The master cylinder 4 includes a master cylinder housing (cylinder) 40, the pistons 41, and coil springs 42. The master cylinder housing 40 includes a body portion 40*a*, a flange portion 40*b*, and a fitting portion 40*c*. The body portion 40*a* is formed into a shape of a bottomed cylinder that is closed on one side (positive side of the x-axis) and extends in the x-axis direction. The flange portion 40*b* is provided on the x-axis negative side of an outer periphery of the body portion 40*a*. Fastening portions 40*d* and 40*e* are formed on both y-axis sides of the flange portion 40*b*. The fastening portions 40*d* and 40*e* are each provided with a bolt hole extending in the x-axis direction. The fastening portions 40*d* and 40*e* are located in substantially symmetrical positions across an axial core of the body portion 40*a*.

The fitting portion 40*c* is adjacent to the x-axis negative side of the flange portion 40*b* and formed in a substantially column-like shape which extends in the x-axis direction from the flange portion 40*b*. A sealing member 402 is placed in a sealing groove 401 formed around an outer periphery of the fitting portion 40*c*.

Inside the master cylinder housing 40, there is formed an axial hole 400 extending in the x-axis direction. The hole 400 opens on the x-axis negative side of the master cylinder housing 40. The master cylinder 4 is of a so-called tandem type. The piston 41P and a piston 41S are placed in the hole 400 to be movable (reciprocatable) in the x-axis direction. A concave spherical receiving portion 410 is formed in the x-axis negative side of the piston 41P of the P-system. The receiving portion 410 is in contact with the x-axis positive-side end of the pushrod 2 (contact member 22), which has the convex spherical shape. The pushrod 2 is thus turnably fitted to the receiving portion 410. The piston 41S of the S-system is a free piston and placed in the x-axis positive side of the piston 41P. The pistons 41P and 41S are provided with concave portions 411P and 411S, respectively, which extend in the x-axis direction and open on the x-axis positive side. The pistons 41P and 41S are provided with communication holes 412P and 412S, respectively, extending in a radial direction. The communication holes 412P and 412S connect inner peripheral surfaces of the concave portions 411P and 411S to outer peripheral surfaces of the pistons 41P and 41S, respectively.

In the master cylinder housing 40, there are formed discharge ports 44P and 44S and replenishing ports 45P and 45S. The discharge ports 44P and 44S and the replenishing ports 45P and 45S open in an inner peripheral surface of the hole 400. The discharge ports 44P and 44S extend in the y-axis direction and open in a side face of the master cylinder housing 40, which is located on the y-axis negative side (see FIG. 2). The discharge ports 44P and 44S are then connected through brake pipes (not shown) to the actuator 8 (see FIG. 10). The discharge ports 44P and 44S are allowed to communicate with the wheel cylinders (not shown) via the actuator 8. There are two discharge ports 44P of the P-system. The other discharge port 44P than the above-mentioned discharge port 44P (see FIG. 1) extends in the y-axis direction and opens in a side face of the master cylinder housing 40, which is located on the y-axis positive side. The discharge port 44P that opens on the y-axis positive side is connected through a brake pipe 70 to the stroke simulator 5, and is allowed to communicate with the stroke simulator 5 (main chamber 54). The replenishing ports 45P and 45S extend in the z-axis direction and open on an upper face of the master cylinder housing 40, which is located on the z-axis positive side. The replenishing ports 45P and 45S are then connected to the reservoir tank 3 to come into communication therewith. The replenishing openings 31P and 31S of the reservoir tank 3 are fitted to concave portions 48P and 48S (in which the replenishing ports 45 open) which are located in the upper face of the master cylinder housing 40 with the sealing members 34P and 34S interposed therebetween. The replenishing openings 31P and 31S are thus in communication with the replenishing ports 45P and 45S, respectively. The reservoir tank 3 is installed integrally with the master cylinder 4. The master cylinder 4 is replenished with the brake fluid from the reservoir tank 3 through the replenishing openings 31P and 31S and the replenishing ports 45P and 45S. A fastening portion 49 is situated on a z-axis positive-side end of the master cylinder housing 40 to be located between the concave portions 48P and 48S, as viewed from the y-axis direction. The fastening portion 49 has a hole extending in the y-axis direction, into which a pin for fastening the reservoir tank 3 is to be inserted. The pin (not shown) is inserted into the fastening portion 49 and the fastening portion 35 of the reservoir tank 3. The fastening portion 35 of the reservoir tank 3 is fastened to the fastening portion 49 of the master cylinder housing through the pin, thereby fixing the reservoir tank 3 to the master cylinder housing 40.

Sealing members 46P, 46S, 47P and 47S having a cup-like shape in section are fixed to the inner peripheral surface of the hole 400. The sealing members 46P and 47P are placed across an opening of the replenishing port 45P in the x-axis direction. The sealing members 46S and 47S are placed across an opening of the replenishing port 45S in the x-axis direction. An inner peripheral side (lip portion) of each of the sealing members 46P, 46S, 47P and 47S are in contact with the outer peripheral surfaces of the pistons 41P and 41S. The sealing members 46P, 46S, 47P and 47S regulate the flow of the brake fluid passing through a gap between the inner periphery of the hole 400 and the outer peripheries of the pistons 41P and 41S into one direction. The sealing member 46P of the P-system regulates the flow of the brake fluid running from the replenishing port 45P in the negative direction of the x-axis (outside the master cylinder housing 40). The sealing member 46S of the S-system allows the brake fluid only to flow from the replenishing port 45S in the negative direction of the x-axis. The sealing members 47P and 47S allow only the flows of the brake fluid running from the replenishing ports 45P and 45S in the positive direction of the x-axis.

In the interior (hole 400) of the master cylinder housing 40, a hydraulic chamber 43 is defined. The hydraulic chamber 43 includes a hydraulic chamber 43P of the P-system and a hydraulic chamber 43S of the S-system. The hydraulic chamber 43P of the P-system is defined in between the pistons 41P and 41S (area sealed with the sealing members 47P and 46S). The hydraulic chamber 43S of the S-system is defined in between the piston 41S and a bottom of the master cylinder housing 40 (area sealed with the sealing member 47S). In the hydraulic chambers 43P and 43S, coil springs 42P and 42S functioning as retractor springs for the pistons 41P and 41S are placed in a compressed position. The discharge ports 44P and 44S open in the hydraulic chambers 43P and 43S, respectively. As illustrated in FIG. 9, when the brake pedal is in an unapplied position (when the flange portion 21 of the pushrod 2 is in contact with a stopper portion 507 of a stroke simulator housing 50), the pistons 41P and 41S are situated furthest on the negative side of the x-axis, and the communication holes 412P and 412S of the pistons 41P and 41S are situated further on the negative side of the x-axis than the sealing members 47P and 47S. The replenishing ports 45P and 45S therefore lead to the inner periphery side of the concave portions 411P and 411S of the pistons 41P and 41S, that is, the hydraulic chambers 43P and 43S through the communication holes 412P and 412S, respectively. Movement of the pistons 41P and 41S in the x-axis direction within the hole 400 generates hydraulic brake pressure. To be more specific, in reaction to the brake operation by the driver, the thrust force of the pushrod 2, which acts in the positive direction of the x-axis, is transmitted to the piston 41P. When the pistons 41P and 41S stroke in the positive direction of the x-axis, the hydraulic chambers 43P and 43S are reduced in volume. When the communication holes 412P and 412S move to positions further on the positive side of the x-axis than the sealing members 47P and 47S, the sealing members 47P and 47S interrupt the communication from the hydraulic chambers 43P and 43S to the replenishing ports 45P and 45S (reservoir tank 3) through the communication holes 412P and 412S. This generates hydraulic pressure (master-cylinder hydraulic pressures) corresponding to the brake operation in the hydraulic chambers 43P and 43S. The hydraulic pressure generated in the hydraulic chamber 43P and that in the hydraulic chamber 43S are substantially the same. The brake fluid (master-cylinder hydraulic pressure) is supplied from the hydraulic chambers 43P and 43S through the discharge ports 44P and 44S toward the actuator 8 (wheel cylinders).

The stroke simulator 5 allows the brake fluid flown out of the master cylinder 4 to enter the stroke simulator 5. The stroke simulator 5 is an operation reaction force source which creates an artificial operation reaction force of the brake pedal. The stroke simulator 5 is connected through the fluid path (brake pipe 70) to the master cylinder 4, and also connected through the fluid path (brake pipe 71) to the reservoir tank 3. The stroke simulator 5 includes the stroke simulator housing 50, a reaction piston 51, and a coil spring 52. The stroke simulator housing 50 integrally includes a body portion 50a, a connecting portion 50b, and a flange portion 50c.

The body portion 50a has a shape of a stepped bottomed cylinder, and integrally includes a large-diameter cylinder portion 50d, a small-diameter cylinder portion 50e, and a flange portion 50f. The small-diameter cylinder portion 50e is situated in the x-axis positive side of the large-diameter cylinder portion 50d to be substantially coaxial with the cylinder portion 50d. The flange portion 50f is situated in the x-axis positive side of the small-diameter cylinder portion 50e to be substantially coaxial with the cylinder portion 50e. The cylinder portion 50e is provided with an air bleeder 57 for removing air existing in the stroke simulator 5. The air bleeder 57 protrudes in the negative direction of the y-axis from the x-axis positive side and z-axis positive side of an outer peripheral surface of the cylinder portion 50e. The flange portion 50f (main body except for fastening portions 50g and 50h mentioned below) has an external diameter that is larger than an external diameter of the cylinder portion 50e and smaller than an external diameter of the cylinder portion 50d.

The fastening portion 50g, in which a bolt hole extending in the x-axis direction is formed, is situated on the y-axis positive side and z-axis negative side of the flange portion 50f. The fastening portion 50h, in which a bolt hole extending in the x-axis direction is formed, is situated on the y-axis negative side and z-axis positive side of the flange portion 50f. The fastening portions 50g and 50h are situated in substantially symmetrical positions across an axial core of the body portion 50a. Insertion of bolts in the bolt holes of the fastening portion 50g and the fastening portion 50h connects the stroke simulator 5 to a stroke simulator valve 6. Formed in the body portion 50a are a first axial hole 501, a second axial hole 502, a valve mounting hole 503, a fluid path 55, and the like. The first axial hole 501 is formed on an inner periphery side of the large-diameter cylinder portion 50d so as to extend in the x-axis direction. The second axial hole 502 has a smaller diameter than the first axial hole 501. The second axial hole 502 is formed on an inner periphery side of the small-diameter cylinder portion 50e so as to extend continuously from the first axial hole 501 in the x-axis direction, and opens in a bottom of the cylinder portion 50d, which is located on the x-axis positive side. A fluid path of the air bleeder 57 opens in an x-axis positive-side end and z-axis positive-side end of the second axial hole 502. One end of the body portion 50a (the x-axis positive-side end of the second axial hole 502) is closed, and the other end (the x-axis negative-side end of the first axial hole 501) is open.

The valve mounting hole 503 is formed on an inner periphery side of the flange portion 50f and that of the cylinder portion 50e to extend in the x-axis direction, and opens on the x-axis positive side of the flange portion 50f. The valve mounting hole 503 has a stepped shape in which a diameter thereof decreases from the positive toward negative side of the x-axis. The x-axis negative-side end of the valve mounting hole 503 and the x-axis positive-side end of the second axial hole 502 are linked together through the fluid path 55 extending in the x-axis direction. The axial holes 501 and 502, the valve mounting hole 503, and the fluid path 55 are formed to be substantially coaxial with one another. A connection port 58 leading to the first axial hole 501 is formed on the z-axis positive side and y-axis positive side of the cylinder portion 50d. The connection port 58 is connected with a pipe attachment portion 580. The pipe attachment portion 580 is attached with the other end of the brake pipe 71. The pipe attachment portion 580 protrudes in the positive direction of the y-axis approximately from the x-axis positive side, y-axis positive side, and z-axis positive side of an outer surface of the cylinder portion 50d, and then bends in the positive direction of the x-axis. A tip end of the pipe attachment portion 580 to which the brake pipe 71 is attached opens on the x-axis positive side.

The brake pipe 71 is not a steel pipe but a flexible pipe made of material such as rubber. As illustrated in FIG. 5, the brake pipe 71 is installed to have a shape of the letter U as viewed from the positive side of the y-axis. The brake pipe 71 extends from the pipe attachment portion 320a of the reservoir tank 3 in the positive direction of the x-axis, and bends in the negative direction of the z-axis in a manner wrapping around the discharge port 44P (which opens in a protruding position on the y-axis positive side). The brake pipe 71 then bends back in the negative direction of the x-axis to be attached to the pipe attachment portion 580. The first axial hole 501 is connected through the brake pipe 71 to the replenishing port 32a of the reservoir tank 3, leading to the reservoir tank 3. A connection port 59 is formed in the y-axis positive side of a boundary region between the cylinder portion 50e and the flange portion 50f. The connection port 59 leads to the valve mounting hole 503 and is connected through the brake pipe 70 to the discharge port 44P that opens on the y-axis positive side of the master cylinder 4, thereby leading to the master cylinder 4 (hydraulic chamber 43P). The brake pipe 70 is formed as a pipe with a smaller diameter and higher rigidity (steel pipe, for example) as compared to the braking pipe 71. As illustrated in FIG. 7, the brake pipe 70 is installed to have a shape of the letter U as viewed from the x-axis direction. The brake pipe 70 extends from the discharge port 44P that opens on the y-axis positive side of the master cylinder 4, and bends in the positive direction of the y-axis and the negative direction of the z-axis. The brake pipe 70 then bends back in negative direction of the y-axis in a manner wrapping around the brake pipe 71 to be connected to the connection port 59.

The connecting portion 50b is situated on the z-axis positive side of the body portion 50a (cylinder portion 50d). The connecting portion 50b has a shape of a bottomed cylinder extending in the x-axis direction. Fastening portions 50i and 50j, in which bolt holes extending in the x-axis direction are formed, are situated in both y-axis sides of the connecting portion 50b. An outer peripheral surface of the connecting portion 50b (including the fastening portions 50i and 50j) is formed substantially identical to the outer peripheral surface of the flange portion 40b (including the fastening portions 40d and 40e) of the master cylinder housing 40 in shape and dimensions as viewed from the x-axis direction. The pipe attachment portion 320a of the reservoir tank 3 is located further on the negative side of the y-axis than the y-axis positive-side edge of the connecting portion 50b (fastening portion 50i) (does not protrude further in the positive direction of the y-axis than the fastening portion 50i). The pipe attachment portion 320b of the reservoir tank 3 is located further on the positive side of the y-axis than a y-axis negative-side edge of the connecting portion 50b (fastening portion 50j) (does not protrude further in the negative direction of the y-axis than the fastening portion

50j). A y-axis negative-side tip end of the air bleeder 57 is located further on the positive side of the y-axis than a y-axis negative-side edge of the connecting portion 50b (fastening portion 50j) (does not protrude further in the negative direction of the y-axis than the fastening portion 50j).

As illustrated in FIG. 9, a first axial hole 504, a second axial hole 505, and a third axial hole 506 are formed inside the connecting portion 50b. The first axial hole 504 is formed in a substantially cylindrical shape extending in the x-axis direction and opens in the x-axis positive side of the connecting portion 50b. The first axial hole 504 has a diameter that is slightly larger than a diameter of a fitting portion 40c of the master cylinder housing 40. The second axial hole 505 has a smaller diameter than the first axial hole 504 and extends continuously from the first axial hole 504 in the x-axis direction. The third axial hole 506 has a smaller diameter than the second axial hole 505 and extends continuously from the second axial hole 505 in the x-axis direction to open on the x-axis negative side of the stroke simulator housing 50 (vehicle mounting face 508 side). The axial holes 504 to 506 are substantially coaxial with one another. The fastening portions 50i and 50j are situated in substantially symmetrical positions across axial cores of the holes 504 to 506. A stopper portion 507 is formed in an x-axis negative-side bottom of the connecting portion 50b in a manner surrounding the third axial hole 506. An x-axis positive-side face of the stopper portion 507 is tapered to be substantially parallel to an x-axis negative-side face of the flange portion 21 of the pushrod 2, and allowed to come into contact with the x-axis negative-side face of the flange portion 21.

The flange portion 50c is situated on the x-axis negative side of the stroke simulator housing 50 and formed into a plate expanding substantially parallel with a y-z plane. The flange portion 50c is a fixed flange for fixing the stroke simulator housing 50 to the vehicle. The flange portion 50c has a substantially rectangular shape with sides extending in the y-axis direction and sides extending in the z-axis direction as viewed in the x-axis direction. Stud shafts (stud bolts serving as fixing members) 509 are fixed to four corners of the flange portion 50c to protrude on the x-axis negative side. An axial core of the body portion 50a (axial hole 501, etc.) and that of the connecting portion 50b (axial hole 504, etc.) are positioned substantially in the center of the flange portion 50c as viewed in the y-axis direction. The axial core of the connecting portion 50b is positioned substantially in the center of the flange portion 50c as viewed in the z-axis direction. The axial core of the body portion 50a is positioned on a little lower side (further on the negative side of the z-axis) than a z-axis negative-side end portion of the flange portion 50c (see FIG. 7). Width (y-axis dimension) of the flange portion 50c is larger than width (y-axis dimension) of the body portion 50a, larger than width (y-axis dimension) of the body portion 40a of the master cylinder housing 40, and larger than width (y-axis dimension) of the reservoir tank 3. Width (y-axis dimension) of the flange portion 50c is substantially the same as width (y-axis dimension) of the connecting portion 50b or the flange portion 40b of the master cylinder housing 40. As illustrated in FIGS. 3 and 7, peripheral edges of the fastening portions 50i and 50j which form both y-axis edges of the connecting portion 50b and peripheral edges of the fastening portions 40d and 40e which form both y-axis edges of the flange portion 40b substantially aligned with both y-axis edges of the flange portion 50c (located substantially in the same y-axis positions). As illustrated in FIG. 5, height (z-axis dimension) of the flange portion 50c is larger than height (z-axis dimension) of the connecting portion 50b, and also larger than height (z-axis dimension) of the master cylinder housing 40 (flange portion 40b).

As illustrated in FIG. 9, in the second axial hole 502 of the body portion 50a of the stroke simulator housing 50, the reaction piston 51 is placed to be movable in the x-axis direction. The reaction piston 51 protrudes from the x-axis negative-side end of the second axial hole 502 into the first axial hole 501. A spring retainer 512 is placed in the x-axis negative-side end of the reaction piston 51 protruding into the first axial hole 501. The spring retainer 512 is movable integrally with the reaction piston 51 in the first axial hole 501. A sealing groove 510 is formed in an outer periphery of the reaction piston 51. A sealing member 511 is provided to the sealing groove 510. The sealing member 511 is in contact with an inner peripheral surface of the second axial hole 502. Fixed to an opening on the x-axis negative side of the first axial hole 501 is a plate-like spring retainer 53 which closes the opening. A sealing member 532 is provided to an outer periphery of the spring retainer 53. When the sealing member 532 comes into contact with an inner peripheral surface of the first axial hole 501, the opening of the first axial hole 501 is sealed in a liquid-tight manner. A main chamber 54 and a secondary chamber 56 are defined in the stroke simulator housing 50 by the reaction piston 51. The main chamber 54 is defined further on the positive side of the x-axis than the reaction piston 51 within the second axial hole 502. The secondary chamber 56 is defined further on the negative side of the x-axis than the reaction piston 51 within the first axial hole 501. Communication between the main chamber 54 and the secondary chamber 56 is suppressed by the sealing member 511. The fluid path 55 and the fluid path of the air bleeder 57 constantly open in the main chamber 54.

The coil spring 52 functioning as a retractor spring for the reaction piston 51 is placed in the secondary chamber 56 in a compressed position. The coil spring 52 is a resilient member that constantly biases the reaction piston 51 toward the main chamber 54 (in a direction that reduces the volume of the main chamber 54 and increases the volume of the secondary chamber 56). An x-axis positive-side end of the coil spring 52 is held in contact with an outer periphery side of the spring retainer 512, whereas the x-axis negative-side end of the coil spring 52 is held in contact with an outer periphery side of the spring retainer 53. In a region located further on an inner periphery side of the spring retainer 53 than the coil spring 52, a convex portion 530 is formed, which opens on the x-axis positive side. A resilient member 531 is placed in the convex portion 530. The resilient member 531 protrudes further on the positive side of the x-axis than the spring retainer 53. The resilient member 531 is positioned in a region located further on an inner periphery side of the spring retainer 512 than the coil spring 52, and faces the region located in the inner periphery side of the spring retainer 512 in the x-axis direction. When a moving amount of the reaction piston 51 (spring retainer 512) in the negative direction of the x-axis becomes equal to or larger than a predetermined amount, the resilient member 531 comes into contact with the region on the inner periphery side of the spring retainer 512 to be elastically deformed. This regulates the movement of the reaction piston 51 in the negative direction of the x-axis. The resilient member 531 functions as a damper that absorbs impact caused when the movement of the reaction piston 51 is regulated.

The brake apparatus 1 as a master cylinder unit also serves as a valve unit having the stroke simulator valve 6 built in. The stroke simulator valve 6 is a normally-closed (closed in an OFF state) simulator shutoff valve capable of limiting inflow of the brake fluid into the stroke simulator 5. The stroke simulator valve 6 is mounted on the valve mounting hole 503 formed in the stroke simulator housing 50 (body portion 50*a*). An x-axis positive-side face of the body portion 50*a* (flange portion 50*f*), in which the valve mounting hole 503 opens, forms a valve attachment face. The main chamber 54 of the stroke simulator 5 is connected through the fluid path 55 to the stroke simulator valve 6. The stroke simulator valve 6 is connected through a fluid path (brake pipe 70) to the hydraulic chamber 43P of the master cylinder 4.

As illustrated in FIG. 9, the stroke simulator valve 6 includes a solenoid 61, a valve body 62, an armature 63, a plunger 64, a coil spring 65, a valve seat member 66, and a plurality of fluid-path forming members. The solenoid 61 is fastened with a bolt to the flange portion 50*f* (fastening portions 50*g* and 50*h*) located on the x-axis positive-side end of the body portion 50*a* of the stroke simulator housing 50. The armature 63 is fixed to an inner periphery side of the solenoid 61 and generates an electromagnetic force (magnetic attractive force) by the solenoid 61 being switched on. In an x-axis positive-side end of the solenoid 61, a connector portion 610 is placed, which opens on the x-axis positive side. The connector portion 610 is connected with wiring (harness) that supplies drive current to the solenoid 61. The valve body 62 is a non-magnetic hollow cylinder. The valve body 62 is fixed in a fitted manner to an outer periphery of the armature 63, and extends on the x-axis negative side of the armature 63. The plunger 64 is housed to be reciprocatable in the x-axis direction in the valve body 62. A ball-like valve element 640 is placed in an x-axis negative-side tip end of the plunger 64. The valve element 640 operates in the x-axis direction. The coil spring 65 is installed between the armature 63 and the plunger 64 in a compressed position, and constantly biases the plunger 64 in the negative direction of the x-axis. The valve seat member 66 is installed on an inner periphery side of the valve mounting hole 503 of the body portion 50*a*. The valve seat member 66 has a shape of a bottomed cylinder. A valve seat is provided to an x-axis positive-side bottom of the valve seat member 66. An orifice 660 extending in the x-axis direction is formed through the bottom of the valve seat member 66 to open in a central region of the valve seat. The plunger 64 is driven by an electromagnetic force (attractive force acting in the positive direction of the x-axis) of the armature 63, and the valve element 640 opens and closes the orifice 660, to thereby control a communication state of a fluid path including the orifice 660 (simulator fluid path mentioned below).

The fluid-path forming members include a first member 67 as a body, second and third members 68 and 69 as filters, and a sealing member 60. The first member 67 is a hollow member that is fixed by a flange to an x-axis positive-side opening portion of the valve mounting hole 503. The valve seat member 66 is fixed to an inner periphery side of the first member 67. A fluid path is formed between the inner periphery of the first member 67 and an outer periphery of the valve seat member 66. The second member 68 is a ring-like filter member that is fixed to an x-axis negative side of the first member 67. The valve seat member 66 is placed on an inner periphery side of the second member 68. A fluid path is formed between the inner periphery of the second member 68 and the outer periphery of the valve seat member 66. The third member 69 is a disc-like filter member (retainer of the sealing member 60) that is placed in an x-axis negative-side bottom of the valve mounting hole 503. The valve member 66 is placed on the inner periphery side of the third member 69. The sealing member 60 is a sealing member having a cup-like section similar to the section of the sealing member 46 and the like. The sealing member 60 is placed between the second member 68 and the third member 69. The valve seat member 66 is fixed on an inner periphery side of the sealing member 60. There is no fluid path formed between the inner periphery of the sealing member 60 and the outer periphery of the valve seat member 66. A lip portion located on an outer periphery side of the sealing member 60 is in contact with an inner peripheral surface of the valve mounting hole 503 to open on the x-axis positive side. Regarding circulation of the brake fluid between the sealing member 60 (lip portion) and the inner peripheral surface of the valve mounting hole 503, the brake fluid is allowed to flow only from the negative to positive side of the x-axis, and is suppressed from flowing in the opposite direction.

The connection port 59 opens in the inner periphery of the valve mounting hole 503 to be located between the second member 68 and the sealing member 60. The fluid path 55 leading to the main chamber 54 of the stroke simulator 5 opens in an x-axis negative-side bottom of the valve mounting hole 503. The connection port 59 leads to the orifice 660 through a fluid path between an outer periphery of the valve seat member 66 and an inner periphery of the first and second members 67 and 68, and also through a convex portion formed in an x-axis positive-side end of the first member 67. The orifice 660 leads to the fluid path 55 through a fluid path 661 formed on an inner periphery side of the valve seat member 66. The foregoing route connects the hydraulic chamber 43P and the main chamber 54, and forms a simulator fluid path that is switched on/off by the stroke simulator valve 6.

The main chamber 54 of the stroke simulator 5 is in communication with the hydraulic chamber 43P through the fluid path 55, the stroke simulator valve 6, and the brake pipe 70. The secondary chamber 56 of the stroke simulator 5 is connected through the brake pipe 71 to the reservoir tank 3. The secondary chamber 56 is in constant communication with the reservoir tank 3 and is released to low pressure (atmospheric pressure). The secondary chamber 56 forms a back-pressure chamber of the stroke simulator 5. The secondary chamber 56 may be released directly to the low pressure (atmospheric pressure) without being connected to the reservoir tank 3. At the valve-opening of the stroke simulator valve 6, the brake fluid flown out of the master cylinder 4 (hydraulic chamber 43P) in reaction to brake operation by the driver flows through the simulator fluid path into the inside (main chamber 54) of the stroke simulator housing 50. This brake fluid causes the reaction piston 51 to move in the axial direction in the hole 502. In the result, an operation reaction force of the brake pedal is artificially generated. This operation reaction force is then given to the brake pedal. To be more specific, the stroke simulator valve 6 is opened by being switched on to bring the simulator fluid path into communication. The master-cylinder hydraulic pressure acts on the main chamber 54 of the stroke simulator 5 through the simulator fluid path. When hydraulic pressure (master-cylinder hydraulic pressure) equal to or higher than a predetermined value acts on a pressure-receiving face of the main chamber 54, which receives the reaction piston 51, this pressure causes the reaction piston 51 to compress the coil spring 52 and simultaneously moves in the axial direction toward the secondary chamber 56. This increases the volume of the main chamber 54 and makes the brake fluid to flow from the master cylinder 5 (hydraulic chamber 43P) through the simulator fluid path into the main chamber 54. The brake fluid is discharged from the secondary chamber 56 through the brake pipe 71 into the reservoir tank 3.

As described above, when the driver performs the brake operation (depresses the brake pedal), the stroke simulator 5 sucks in the brake fluid from the master cylinder 5 to create a pedal stroke, simulates a fluid rigidity of the wheel cylinders, and materializes a brake pedal feeling. During a period in which only the coil spring 52 is compressed at an early stage of the brake pedal depression, spring constant is low, and increase gradient of the pedal reaction force is also low. During a period in which not only the coil spring 52 but also the resilient member 531 are compressed at a later stage of the brake pedal depression, the spring constant is high, and the increase gradient of the pedal reaction force is also high. The brake pedal feeling is set to be similar to, for example, an existing master cylinder by adjusting the spring constants. If the driver finishes the brake operation (releases the brake pedal), and the pressure in the main chamber 54 is thus reduced less than a predetermined value, the reaction piston 51 is returned to an initial position due to a biasing force (resilient force) of the coil spring 52.

The third member 69 may be provided with a fluid path connecting an inner periphery thereof to the x-axis positive-side end face thereof so that the fluid path 55 leads to the x-axis negative side of the sealing member 60 through the above-mentioned fluid path. In this case, a bypass fluid path is formed, which is parallel with the simulator fluid path, and in which the flowing direction is restricted by the sealing member 60. In the bypass fluid path, the sealing member 60 allows the brake fluid to flow only from the main chamber 54 of the stroke simulator 5 toward the hydraulic chamber 43P of the master cylinder 4. Even if the stroke simulator valve 6 is closed in failure (seizes in a closed position) with the brake fluid in the main chamber 54, the bypass fluid path enables the brake fluid to return from the main chamber 54 through the bypass fluid path toward the master cylinder 4.

An assembly structure of the brake apparatus 1 will be described below. The master cylinder housing 40 is fixed to the stroke simulator housing 50. The housings 40 and 50 are integrally fixed to each other. The housings 40 and 50 include joint surfaces at which the housings are integrally fixed together. The joint surfaces have an outer peripheral surface of the fitting portion 40c of the master cylinder housing 40, an x-axis negative-side end face of the flange portion 40b, an inner peripheral surface of the first axial hole 504 of the connecting portion 50b of the stroke simulator housing 50, and an x-axis positive-side end face of the connecting portion 50b (in which the first axial hole 504 opens). The joint surfaces include socket portions (an outer peripheral surface of the fitting portion 40c and an inner peripheral surface of the first axial hole 504) functioning as a socket joint. That is, a portion of the stroke simulator housing 50 (connecting portion 50b) is dented, and a protruding portion of the master cylinder housing 40 is fitted thereto, thereby jointing the housings 40 and 50 together. More specifically, the fitting portion 40c of the master cylinder housing 40 is inserted into the first axial hole 504 of the stroke simulator housing 50 to fit the housings 40 and 50 together. By sliding the housings 40 and 50 against each other in the x-axis direction, the x-axis negative-side end face of the flange portion 40b of the flange portion 40b of the master cylinder housing 40 comes into contact with the x-axis positive-side end face of the connecting portion 50b. A bolt 10 is inserted into the fastening portions 40d and 40e of the master cylinder housing 40 (flange portion 40b) and the fastening portions 50i and 50j of the stroke simulator housing 50 (connecting portion 50b), and the fastening portions 40d and 40e and the fastening portions 50i and 50j are thus fastened together. In this manner, the master cylinder housing 40 and the stroke simulator housing 50 are integrally fastened together. When the sealing member 402 placed in the fitting portion 40c comes into contact with the inner peripheral surface of the first axial hole 504, the opening of the first axial hole 504 is sealed in a liquid-tight manner. The master cylinder housing 40 has a portion protruding in the negative direction of the x-axis further than the fitting portion 40c, in an inner periphery side of the fitting portion 40c. The portion of the master cylinder housing 40, which is protruding in the negative direction of the x-axis further than the fitting portion 40c, is housed within the first axial hole 504. The piston 41P protruding from the hole 400 of the master cylinder housing 40 in the negative direction of the x-axis is housed within the second axial hole 505.

The brake apparatus 1 has the vehicle mounting face 508 for mounting the stroke simulator housing 50 (brake apparatus 1) on the vehicle. The vehicle mounting face 508 has an x-axis negative-side face of the stroke simulator housing 50. The x-axis negative-side face of the stroke simulator housing 50 includes an x-axis negative-side face of the flange portion 50c. The stroke simulator housing 50 is fastened by the stud shafts 509 to the x-axis positive side of a lower portion (land surface-side portion) of a dash panel (floor panel) of a vehicle body (not shown). The dash panel is a vehicle body-side partition member that divides an engine room (or a motor room in which a power unit such as a drive motor is installed. Hereinafter, it will be simply referred to as an engine room) from a vehicle interior. The stroke simulator housing 50 is fixed to the dash panel at four fixing points while a spacer (not shown) screwed onto or inserted into the stud shafts 509 is forming a small x-axial space between the flange portion 50c and the dash panel. Dimensions (x-axis thickness, y-axis width, and z-axis height) of the flange portion 50c are determined so as to secure a sufficient mounting strength of the brake apparatus 1 on the vehicle and yet not to be unnecessarily large.

Since the master cylinder housing 40 is fixed to the stroke simulator housing 50 in the above-described manner, the master cylinder housing 40 is fixed to the vehicle with the stroke simulator housing 50 intervening therebetween. An x-axis negative side of the pushrod 2 pierces the dash panel to protrude into the vehicle interior (x-axis negative side) with the brake apparatus 1 fixed to the dash panel. The master cylinder 4, the reservoir tank 3, the stroke simulator 5, and the like are installed on a vehicle's front side (x-axis positive side) in the engine room. A part of the stopper portion 507 of the stroke simulator housing 50 protrudes further on the negative side of the x-axis than the vehicle mounting face 508 to form an engaging portion. A boot 2a is attached to the engaging portion to cover the pushrod 2. As described above, the stroke simulator housing 50 can be fixed to the dash panel with the stud shafts 509 rigidly (without a resilient element interposed therebetween). For that reason, a good reaction force is generated relative to a brake operation force (pedal pressure) of the driver, which is inputted to the brake pedal (pushrod 2), and at the same time, the brake operation force is properly transmitted to the piston 41 of the master cylinder 4. In the result, the master-cylinder hydraulic pressure corresponding to the brake operation force is generated. The stroke simulator housing 50, however, may be fixed to the dash panel with a resilient element interposed therebetween.

A configuration of the brake apparatus 1 will be now explained. The master cylinder 4 and the stroke simulator 5 are placed vertically relative to each other as viewed in the z-axis direction when installed in the vehicle. That is, the master cylinder 4 and the stroke simulator 5 are integrally arranged as viewed from a perpendicular direction (in a perpendicular direction) to overlap each other when installed in the vehicle. The installation in the vehicle is carried out so that the reservoir tank 3, the master cylinder 4, and the stroke simulator 5 are arranged in the order given from top to bottom. The reservoir tank 3 is placed on the master cylinder 4, and the stroke simulator 5 under the master cylinder 4. The master cylinder 4 and the stroke simulator 5 are arranged in parallel to each other. In other words, the axial direction of the master cylinder 4 and that of the stroke simulator 5 are substantially the same. As a result, when installed in the vehicle, the master cylinder 4 and the stroke simulator 5 are positioned vertically relative to each other with the axial directions thereof aligned with each other.

As illustrated in FIG. 7, the installation in the vehicle is carried out so that a y-axis center of the reservoir tank 3, the axis of the master cylinder 4, and the axis of the stroke simulator 5 are arranged substantially in the same straight line parallel with the z-axis, as viewed from the x-axis direction. When installed in the vehicle, therefore, a range in which the reservoir tank 3, the master cylinder 4, and the stroke simulator 5 overlap one another in the perpendicular direction reaches its largest size. Area obtained by projecting the reservoir tank 3, the master cylinder 4, and the stroke simulator 5 in the perpendicular direction reaches its smallest value. As illustrated in FIGS. 3 and 4, the master cylinder 4 (body portion 40a of the master cylinder housing 40) and the stroke simulator 5 (body portion 50a of the stroke simulator housing 50) are installed to fit in width (y-axis dimension) of the reservoir tank 3. The brake pipes 70 and 71 are installed to fit in height (z-axis dimension) of the reservoir tank 3, the master cylinder housing 40, and the stroke simulator housing 50 altogether as illustrated in FIG. 5. For example, the brake pipe 71 does not protrude further on the positive side of the z-axis than the reservoir tank 3. The brake pipe 70 does not protrude further on the negative side of the z-axis than the stroke simulator housing 50.

As viewed in the y-axis direction, each member and structure of the brake apparatus 1 is installed to fit in the width of the flange portion 50c of the stroke simulator housing 50. For example, as illustrated in FIGS. 3 and 4, the master cylinder 4 (flange portion 40b including the fastening portions 40d and 40e of the master cylinder housing 40, etc.) and the stroke simulator 5 (connecting portion 50b including the fastening portions 50i and 50j of the stroke simulator housing 50, etc.) are so configured as to fit in the width (y-axis dimension) of the flange portion 50c. As illustrated in FIGS. 3 and 7, the brake pipe 71 is installed to fit in the width (y-axis dimension) of the flange portion 50c. To be more specific, the brake pipe 71 is situated substantially parallel to an x-z plane, and (the y-axis positive-side end) of the brake pipe 71 is positioned further on the negative side of the y-axis than the y-axis positive-side edge of the flange portion 50c (does not protrude further on the positive side of the y-axis than the flange portion 50c).

The stroke simulator valve 6 is placed in the axial position of the stroke simulator 5. As illustrated in FIG. 7, the stroke simulator valve 6 is situated to overlap a one side of the axis (x-axis positive side) of the stroke simulator 5 as viewed from the axial direction (x-axis direction) of the stroke simulator 5. An operation direction of the valve element 640 (plunger 64) of the stroke simulator valve 6 is substantially the same as a moving direction of the reaction piston 51 of the stroke simulator 5. More specifically, the stroke simulator valve 6 is situated substantially coaxially with the stroke simulator 5. The stroke simulator valve 6 (valve mounting hole 503) has a central axis that is positioned substantially in the same straight line as a central axis of the stroke simulator 5 (axial holes 501 and 502). A range in which the stroke simulator 5 and the stroke simulator valve 6 overlap each other in the axial directions reaches its largest size. In the result, area obtained by projecting the stroke simulator 5 and the stroke simulator valve 6 in the x-axis direction reaches its smallest value. As illustrated in FIG. 7, the stroke simulator valve 6 (flange portion 50f including the fastening portions 50g and 50h of the stroke simulator housing 50, the solenoid 61, etc.) is installed to fit in width (y-axis dimension) and height (z-axis dimension) of the stroke simulator 5 (body portion 50a of the stroke simulator housing 50).

When installed in the vehicle, the stroke simulator valve 6 is disposed under the master cylinder 4 to overlap the master cylinder 4 as viewed from the perpendicular direction. The master cylinder 4 and the stroke simulator valve 6 are situated parallel to each other (so that the axial directions thereof are substantially the same). The master cylinder 4 and the stroke simulator valve 6 are therefore positioned vertically relative to each other with the axial directions thereof aligned with each other. When installed in the vehicle, the axis of the master cylinder 4 and that of the stroke simulator valve 6 are aligned substantially in the same straight line parallel to the z-axis as viewed from the x-axis direction. A range in which the master cylinder 4 and the stroke simulator valve 6 overlap each other as viewed from the perpendicular direction reaches the largest size. As illustrated in FIGS. 4 and 7, the stroke simulator valve 6 (flange portion 50f including the fastening portions 50g and 50h of the stroke simulator housing 50, the solenoid 61, etc.) is installed to fit in width (y-axis dimension) of the master cylinder 4 (body portion 40a of the master cylinder housing 40).

As illustrated in FIGS. 3 and 4, an x-axis negative-side end of the stroke simulator 5, more specifically, an x-axis negative-side end of the body portion 50a of the stroke simulator housing 50 extends up to the flange portion 50c as viewed in the x-axis direction. An x-axis positive-side end of the stroke simulator valve 6, more specifically, an x-axis positive-side end of the solenoid 61 except for the connecter 610 is located further on the negative side of the x-axis than an x-axis positive-side end face of the master cylinder housing 40 (does not protrude further on the positive side of the x-axis than the master cylinder housing 40). As illustrated in FIGS. 3 to 6, an x-axis positive-side end of the reservoir tank 3, an x-axis positive-side end of the master cylinder 4, and the x-axis positive-side end of the stroke simulator valve 6 (connector portion 610) are located substantially in the same x-axial positions. As illustrated in FIGS. 4 and 5, the brake pipe 71 is installed to fit in length (x-axis dimension) of the master cylinder housing 40 and the stroke simulator housing 50. For example, (an x-axis positive-side end of) the brake pipe 71 is located further on the negative side of the x-axis than the x-axis positive-side end face of the master cylinder housing 40 (does not protrude further on the positive side of the x-axis than the master cylinder housing 40).

As illustrated in FIG. 8, when the brake apparatus 1 is viewed from the negative side of the x-axis, the master cylinder 4, the stroke simulator 5, and (a large portion on a z-axis negative side of) the brake pipe 71 are shielded by the flange portion 50c. As illustrated in FIG. 3, when the brake apparatus 1 is viewed from the positive side of the z-axis, the master cylinder 4 (except for a part of the flange portion 40b of the master cylinder housing 40) and the stroke simulator 5 (except for a part of the connecting portion 50b of the stroke simulator housing 50, the flange portion 50c, etc.) are shielded by the reservoir tank 3. As illustrated in FIG. 6, when the brake apparatus 1 is viewed from the negative side of the y-axis, the brake pipes 70 and 71 are shielded by the reservoir tank 3, the master cylinder 4, and the stroke simulator 5 (except that a part of the z-axis negative side of the brake pipe 71 and a part of the brake pipe 70 are visible through a gap between the master cylinder housing 40 and the stroke simulator housing 50).

Figure 10:
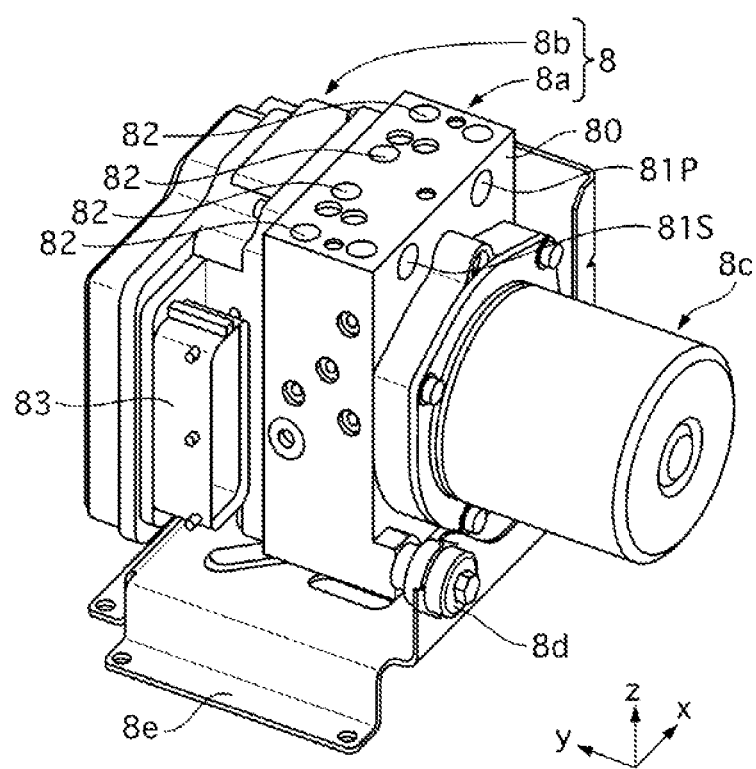
FIG. 10 is a perspective view of an actuator 8 according to the Embodiment 1.

The actuator 8 will be described below. FIG. 10 is a perspective view of the actuator 8 viewed from the negative side of the x-axis, the negative side of the y-axis, and the positive side of the z-axis. The actuator 8 is a second hydraulic brake pressure source that is supplied with the brake fluid from the master cylinder 4 and the reservoir tank 3, and thus capable of generating hydraulic brake pressure independently of the brake operation by the driver. The actuator 8 is a hydraulic control unit that is situated between the wheel cylinder of each wheel and the master cylinder 4 and capable of individually supplying the wheel cylinders with the master-cylinder hydraulic pressure or self-generated hydraulic control pressure. The actuator 8 is provided with a hydraulic unit 8a, a controller (electric control unit ECU) 8b that controls operation of the hydraulic unit 8a. The hydraulic unit 8a and the controller 8b are configured as a single unit.

The hydraulic unit 8a includes, as hydraulic devices for generating hydraulic control pressure, a pump functioning as a hydraulic pressure source and a plurality of control valves (electromagnetic valves) that switch a communication state of fluid paths formed in a housing 80. The hydraulic unit 8a (housing 80) is integrally attached with a motor 8c that activates the pump. A specific hydraulic circuit configuration of the hydraulic unit 8a is identical to that of well-known hydraulic units, so that descriptions thereof will be omitted. The hydraulic unit 8a is provided with a hydraulic-pressure sensor that detects hydraulic pressure of a predetermined portion of the fluid path (master-cylinder hydraulic pressure, etc.). A detection value of the hydraulic-pressure sensor is inputted to the controller 8b. On the basis of various pieces of inputted information, the controller 8b controls operation of each device of the hydraulic unit 8a, and thus controls the hydraulic pressure of each wheel cylinder independently of the brake operation by the driver.

The hydraulic unit 8a is connected to the brake apparatus 1 through a brake pipe. The hydraulic unit 8a is situated, for example, under the brake apparatus 1 so that the directions of the x-axis and the other axes shown in FIG. 10 coincide with those of the x-axis and the other axes shown in FIG. 1. This reduces a projected area as viewed in the perpendicular direction (vertical direction of the vehicle) of the entire brake system, and improves mountability on the vehicle. The housing 80 of the hydraulic unit 8a is fixed to the vehicle body side (floor of the engine room) through a damper 8d and a bracket 8e. In the top of the housing 80, there are formed master cylinder ports 81 of the P- and S-systems and four wheel cylinder ports 82, as openings of fluid paths formed in the housing 80. The master cylinder port 81P of the P-system is connected through a brake pipe to the discharge port 44P (on the y-axis negative side) of the P-system of the master cylinder 4, thereby leading to the hydraulic chamber 43P. The master cylinder port 81S of the S-system is connected through another brake pipe to the discharge port 44S of the S-system of the master cylinder 4, thereby leading to the hydraulic chamber 43S. The wheel cylinder ports 82 are connected through brake pipes to the respective wheel cylinders. The other ports of the housing 80 lead to the reservoir tank 3 by being connected through brake pipes to a replenishing opening 32b of the reservoir tank 3.

The controller 8b is configured independently of the master cylinder 4, that is to say, independently of the brake apparatus 1 (master cylinder unit including the stroke simulator valve 6). The controller 8b is provided with a connector 83 connected with a harness. The stroke simulator valve 6 and the controller 8b are connected together through the harness. The controller 8b is inputted with a detection value transmitted from a pedal stroke sensor that detects an amount of operation of the brake pedal, a detection value transmitted from the hydraulic-pressure sensor that detects the pump's discharge pressure and the master-cylinder hydraulic pressure, and information pertaining to a running condition, which is transmitted from the vehicle. On the basis of the detection values and the information, the controller 8b controls the opening and closing of each electromagnetic valve of the hydraulic unit 8a and the motor's rotational frequency (discharge amount of the pump) in accordance with an internally-stored program. The foregoing control of the wheel-cylinder hydraulic pressure makes it possible to achieve boost control for reducing the braking force required, anti-lock brake control (ABS) for suppressing a vehicle slip caused by braking (lessening a locking tendency), brake control (vehicle behavior control, such as VDC and ESC) for stabilizing vehicle behavior by suppressing a vehicle skidding and the like, automatic brake control such as a preceding-vehicle follow-up control, and regenerative coordination brake control for achieving target deceleration (target braking force) in coordination with a regenerative brake. For example, the boost control adds assist hydraulic pressure produced by activating the hydraulic unit 8a (using the discharge pressure of the pump) to the master-cylinder hydraulic pressure generated according to the brake operation, to thereby create the wheel-cylinder hydraulic pressure higher than the master-cylinder hydraulic pressure.

When the hydraulic unit 8a is not in operation, the hydraulic chamber 43 of the master cylinder 4 and the wheel cylinder of each wheel is in communication with each other. At this time, the wheel-cylinder hydraulic pressure is generated by the master-cylinder hydraulic pressure generated using the driver's brake operation force (pedal pressure) (pedal pressure braking). According to the depression of the brake pedal, the brake fluid is supplied from the hydraulic chamber 43 of each system of the master cylinder 4 (through the fluid paths in the hydraulic unit 8a) to each wheel cylinder (during boosting). In short, the master-cylinder hydraulic pressure generated according to the depression of the brake pedal is directly supplied to the wheel cylinders. When the brake pedal is released, the brake fluid returns from each wheel cylinder (through the fluid paths in the hydraulic unit 8a) to the master cylinder 4 (during depressurization). At this time, the stroke simulator valve 6 placed in the simulator fluid path is switched off to be closed. This blocks the communication between the master cylinder 4 (hydraulic chamber 43P) and the stroke simulator 5 (main chamber 54).

When the hydraulic unit 8a is in operation, it is possible to block the communication between the hydraulic chamber 43 of the master cylinder 4 and each wheel cylinder, and simultaneously create the wheel-cylinder hydraulic pressure from the hydraulic pressure generated using the pump. This way, a so-called brake-by-wire system is configured, which makes it possible to carry out the boost control, the regenerative coordination brake control, etc. In the foregoing situation, the stroke simulator valve 6 is switched on to be opened. This brings the master cylinder 4 (hydraulic chamber 43P) and the stroke simulator 5 (main chamber 5) into communication with each other. If the driver performs brake operation (depresses or releases the brake pedal), the stroke simulator 5 sucks in and discharges the brake fluid from the master cylinder 4 and creates pedal strokes. The controller 8b controls the operation (ON/OFF switching) of the stroke simulator valve 6. The controller 8b is, in a manner of speaking, an integration of a hydraulic-pressure controller for controlling the wheel-cylinder hydraulic pressure and a controller that controls the stroke simulator valve 6. The former hydraulic-pressure controller includes the latter controller.

Operation of Embodiment 1

Operation will now be described. In the brake system of the present embodiment, the brake apparatus 1 and the actuator 8 are provided independently of (separately from) each other. This offers a high versatility of each device (brake apparatus 1 and actuator 8) and easy application of the brake system to vehicles of different types. Furthermore, the brake apparatus 1 can be downsized, as compared to when the brake apparatus 1 and the actuator 8 are integrally formed. In general, a space for installing a brake apparatus in a vehicle, which functions as an input device inputted with brake operations, is limited. The downsizing of the brake apparatus 1 increases a degree of freedom in placement of the brake apparatus 1.

In the brake system of the present embodiment, the actuator 8 is capable of generating the wheel-cylinder hydraulic pressure higher than the master-cylinder hydraulic pressure and thus conducting the boost control that reduces the braking force required. This means that the actuator 8 provided independently of the brake apparatus 1 to function as a device for controlling wheel-cylinder hydraulic pressure can be used also as a boosting device. This eliminates the need for a conventional boosting device, for example, a master back that boosts the brake operation force using the intake pressure (negative pressure) generated by the vehicle engine. The brake apparatus 1 serving as an input device is not required to have a booster that boosts the brake operation force by using an accumulating device (accumulator), an electric motor or the like. This enables simplification of the entire brake system, so that the brake system has a high applicability to vehicles. It is also possible to downsize the brake apparatus 1 and save space in the vehicle at the same time. For example, the brake apparatus 1 can be placed in a space that had been required for installation of the master back. Instead of making the actuator 8 function also as a boosting device, it is possible to provide a boosting device of a link-type using a link mechanism or an electric type (hydraulic type) using an electric motor or the like. The brake apparatus 1 (brake system) of the present embodiment is suitable for a vehicle capable of generating a regenerative braking force, and is also applicable to other vehicles (non-electric vehicles whose only drive source is an engine).

In the brake apparatus 1, the reservoir tank 3, the master cylinder 4, and the stroke simulator 5 are provided integrally (to form a single master cylinder unit). This shortens the fluid paths connecting the reservoir tank 3, the master cylinder 4, and the stroke simulator 5 to one another. It is also possible to downsize the brake apparatus 1 serving as an input device including the reservoir tank 3, the master cylinder 4, and the stroke simulator 5. The downsizing of the brake apparatus 1 makes it easy for the brake apparatus 1 to be installed in vehicles of different types and has a high versatility, resulting in decrease in manufacturing costs.

There are usually variations of master cylinders according to size classes of vehicles in which the master cylinders are installed. If a master cylinder and a stroke simulator are formed using a common housing, it is required to provide common housings corresponding to every variations of the master cylinders. In this case, the brake apparatus is difficult to apply to vehicles of different types (vehicle size classes) and difficult to reuse. The brake apparatus therefore might lack versatility. According to the brake apparatus 1, in contrast, the master cylinder housing 40 is fixed to the stroke simulator housing 50. Before the assembly of the brake apparatus 1, the master cylinder 4 and the stroke simulator 5 are independent of each other (they each have their own housings 40 and 50), and separated from each other. At the assembly, the housings 40 and 50 are fixed integrally to the master cylinder 4 and the stroke simulator 5 to form the brake apparatus 1. This eliminates the need to provide another housing for the entire brake apparatus 1 with respect to each variation of the master cylinder 4. Since the existing master cylinder 4 therefore can be used, the brake apparatus 1 is high in versatility relative to vehicles of different types (vehicle size classes). The master cylinder 4 and the stroke simulator 5 are, so to speak, modularized, which makes it possible to properly combine the modules 4 and 5 according to the type (size class) of a vehicle in which they are installed. This facilitates the reuse of existing products. More specifically, the existing master cylinder 4 (master cylinder housing 40) corresponding to the size class of a vehicle in which the master cylinder 4 and the stroke simulator 5 are installed is properly combined with the predetermined stroke simulator 5 (stroke simulator housing 50), thereby obtaining the brake apparatus 1 that is adapted to the vehicle.

The master cylinder housing 40 and the stroke simulator housing 50 are fixed integrally to each other by being joined at joining faces (outer peripheral faces of the fitting portion 40c, etc.) having a socket portion (socket joining). This further facilitates the reuse of an existing (general-purpose) master cylinder. For example, if the stroke simulator housing 50 is provided with a recess (first axial hole 504 in the present embodiment) to which a projection (fitting portion 40c on the x-axis negative side in the present embodiment) originally formed in the housing of the existing master cylinder can be fitted, and the recess and the projection are socket-jointed together, the existing master cylinder 4 can be used without change.

The stroke simulator housing 50 includes the vehicle mounting face 508, and is mounted on the vehicle through the vehicle mounting face 508. The master cylinder 4 and the stroke simulator 5 can be attached to the vehicle without difficulty through the stroke simulator housing 50. The master cylinder housing 40, instead of the stroke simulator housing 50, may be attached to the vehicle. In such a case, however, if the stroke simulator housing 50 is intended to be fixed to the master cylinder housing 40 attached to the vehicle with as less change as possible in the shape of the existing master cylinder housing 40 (for improvement in versatility), this limits a proper region of the master cylinder housing 40, in which the stroke simulator housing 50 can be joined. It is relatively difficult to improve the master cylinder 4 in versatility and attach the stroke simulator 5 to the vehicle through the master cylinder housing 40 (attached to the vehicle) at the same time. The stroke simulator housing 50 is less limited in change of the shape, as compared to the master cylinder housing 40. For this reason, if the stroke simulator housing 50 is attached to the vehicle as in the present embodiment, and the master cylinder 4 is attached to the vehicle through the stroke simulator housing 50, the shape of the stroke simulator housing 50 can be relatively freely decided, which makes it possible to relatively easily secure a region in which the master housing 40 can be joined. Both improvement in versatility of the master cylinder 4 and easy attachment of the master cylinder 4 and the stroke simulator 5 to the vehicle can be achieved. Since the stroke simulator housing 50, not the master cylinder housing 40, is attached to the vehicle in the present embodiment, the versatility of the stroke simulator housing 50 can be improved, as compared to when the master cylinder housing 40 is attached to the vehicle. That is to say, if the stroke simulator housing 50 is attached to the vehicle, a vehicle attachment portion (fitting portion 40c in the present embodiment) originally provided to the existing master cylinder housing can be selected as a region of the master cylinder housing 40, to which the stroke simulator housing 50 is joined. This vehicle attachment portion (fitting portion 40c) is standardized in some measure. If the stroke simulator housing 50 is provided with a recess having a shape corresponding to the standardized vehicle attachment portion (fitting portion 40c), such a housing can be utilized as a general-purpose stroke simulator housing 50. In other words, the general-purpose stroke simulator housing 50 can be combined with any master cylinder housing 40, so that the reuse of the stroke simulator 5 is facilitated.

Since the master cylinder 4 (master cylinder housing 40) and the stroke simulator 5 (stroke simulator housing 50) are formed independently of each other before the assembly, it is preferable that the brake pipes 70 and 71 forming the fluid paths connecting the master cylinder 4 to the stroke simulator 5 be provided. The present embodiment provides the pipe attachment portion 320a of the reservoir tank 3 and the connection port 58 of the stroke simulator 5 in the same side face (on the y-axis positive side) of the brake apparatus 1. The present embodiment thus shortens the brake pipe 71 and improves connection workability and handleability of the brake pipe 71 at the same time. The same holds for the brake pipe 70. At least the brake pipe 71 between the two pipes, which is not applied with high pressure, is made of a flexible material (such as rubber). As compared to when the brake pipe 71 is formed into a steel pipe, placeability and handleability of the brake pipe 71 are improved.

When a conventional brake apparatus with integrally-arranged master cylinder and stroke simulator is installed in a vehicle, the stroke simulator is placed in a horizontal position of the master cylinder (horizontally adjacent to the master cylinder or so as to overlap the master cylinder as viewed in the horizontal direction). Occupation area of the brake apparatus viewed from above is therefore large, which hinders improvement of mountability on the vehicle. In the brake apparatus 1, contrastingly, the master cylinder 4 and the stroke simulator 5 are situated so as to overlap each other as viewed from the perpendicular direction (vertically situated) at the time of installation in the vehicle. The projected area of the brake apparatus 1 viewed from above is thus reduced. It is then possible to reduce a region occupied by the brake apparatus 1 (occupation area) in the engine room as viewed from above, and improve the mountability of the brake apparatus 1 in the vehicle and the placeability of the brake apparatus 1 in the engine room. There also is improvement in workability in installation of the brake apparatus 1 in the engine room. Space in the engine room can be saved. For example, the brake apparatus 1 can be placed right in a space required for installing a master back (a space created by omitting the master back) as viewed from above. This decreases the need to separately prepare a space for installing the brake apparatus 1. It is only required that there is a range in which the master cylinder 4 and the stroke simulator 5 partially overlap each other when vertically projected. Preferably, however, a half or more than half of the stroke simulator 5 overlaps the master cylinder 4. The present embodiment increases the area in which the master cylinder 4 and the stroke simulator 5 overlap each other in the vertical direction by placing the stroke simulator 5 immediately under the master cylinder 4, and thus enhances the foregoing effects.

More specifically, the master cylinder 4 and the stroke simulator 5 are arranged to overlap each other in the axial direction of the master cylinder 4 (x-axis direction) (overlap each other as viewed from a direction orthogonal to the axis of the master cylinder 4). Since the master cylinder 4 and the stroke simulator 5 are arranged to overlap each other in the axial (longitudinal) direction, a dimension of the brake apparatus 1, which extends in the axial direction of the master cylinder 4, is suppressed from being increased. If the master cylinder 4 is disposed so that the axis thereof extends in a front-back direction of the vehicle, it is possible to arrange the master cylinder 4 and the stroke simulator 5 to overlap each other as viewed from above. This reduces the occupation area of the brake apparatus 1.

The axial direction of the master cylinder 4 and that of the stroke simulator 5 are aligned in the same direction (substantially parallel to each other). That is, the axial (longitudinal) direction of the master cylinder 4 and that of the stroke simulator 5 are aligned in the same direction (coincide with each other). As compared to when the axial directions thereof are not in alignment (there is an angle between the two axes), it is possible to reduce the area in which the master cylinder 4 and the stroke simulator 5 as a whole are projected from the axial direction. It is possible to suppress an increase of the dimensions of the brake apparatus 1 viewed in a plane expanding orthogonally to the axis of the master cylinder 4 (dimensions of the entire apparatus viewed in a direction perpendicular to the master cylinder 4). It is possible to minimize the dimensions of the entire apparatus viewed in the direction perpendicular to the axis of the master cylinder 4 when the master cylinder 4 and the stroke simulator 5 as a whole are viewed from the direction perpendicular to the axis of the master cylinder, and also viewed from such a direction that the axis of the master cylinder 4 and that of the stroke simulator 5 are located in the same straight line.

Since the master cylinder 4 and the stroke simulator 5 are arranged in parallel (substantially parallel to each other) to overlap each other in the axial direction of the master cylinder 4 (x-axis direction), it is possible to increase the area in which the master cylinder 4 and the stroke simulator 5 overlap each other as viewed from the direction perpendicular to the axis of the master cylinder 4 (see FIG. 4). The present embodiment can increase the area in which the master cylinder and the stroke simulator 5 overlap each other by aligning the axis of the master cylinder 4 and that of the stroke simulator 5 substantially in the same straight line as viewed from above. The occupation area of the brake apparatus 1 is therefore further reduced.

According to the present embodiment, the area in which the master cylinder 4 and the stroke simulator 5 overlap each other in the vertical direction is set to reach its largest value. This reduces the vertical projected area of the master cylinder 4 and the stroke simulator 5 as a whole and enhances the foregoing effects. As illustrated in FIG. 4, the stroke simulator 5 (except for a part of the connecting portion 50b of the stroke simulator housing 50, the flange portion 50c, etc.) is fit in an outline of the master cylinder 4 (master cylinder housing 40) as viewed from the z-axis direction. The master cylinder 4 (except for a part of the flange portion 40b) is fit in an outline of the reservoir tank 3. As illustrated in FIG. 3, therefore, the vertical projected area of the brake apparatus 1 (except for the flange portion 40b of the master cylinder housing 40, the connecting portion 50b of the stroke simulator housing 50, the pipe attachment portion 320, and the brake pipes 70 and 71) is substantially equal to the vertical projected area of the reservoir tank 3. The vertical projected area of the brake apparatus 1 therefore can be made as small as possible.

The operating direction of the valve element 640 (plunger 64) of the stroke simulator valve 6 and the moving direction of the reaction piston 51 of the stroke simulator 5 are aligned substantially in the same direction. In short, the axial direction of the stroke simulator valve 6 and that of the stroke simulator 5 are aligned in the same direction. As compared to when the axial directions thereof are not in alignment (there is an angle between the axes), it is possible to reduce the projected area of the stroke simulator valve 6 and the stroke simulator 5 as a whole as viewed from the axial direction of the stroke simulator 5. In other words, it is possible to suppress an increase of the dimensions of the brake apparatus 1 in a plane expanding orthogonally to the axis of the stroke simulator 5 (dimensions of the entire apparatus viewed in the direction perpendicular to the axis of the stroke simulator 5). For that reason, if the stroke simulator 5 is disposed so that the axis thereof extends in the front-back direction of the vehicle, it is possible to reduce a region occupied by the brake apparatus 1 in the engine room (occupation area) as viewed in the front-back direction, and thus improve the mountability of the brake apparatus 1 in the vehicle. The alignment of axial directions of the master cylinder 4 and the stroke simulator valve 6 makes the axial directions of the master cylinder 4 and the stroke simulator valve 6 aligned in the same direction (substantially parallel to each other), further reducing the occupation area of the brake apparatus 1 viewed from above in the foregoing manner.

The stroke simulator valve 6 is situated in the axial position of the stroke simulator 5. The stroke simulator valve 6 is therefore situated to overlap the stroke simulator 5 as viewed in the axial (x-axis) direction. This reduces the projected area of the stroke simulator valve 6 and the stroke simulator 5 as a whole as viewed in the axial direction of the stroke simulator 5. According to the present embodiment, the stroke simulator valve 6 is situated to be substantially coaxial with the stroke simulator 5. As the result, the area in which the stroke simulator valve 6 and the stroke simulator 5 overlap each other reaches its largest value as viewed in the axial (x-axis) direction, whereas the projected area reaches its smallest value.

The master cylinder 4 and the stroke simulator valve 6 are situated to overlap each other in the x-axis direction. Since the master cylinder 4 and the stroke simulator valve 6 are situated to overlap each other in the axial (longitudinal) direction, it is possible to suppress an increase of the dimensions of the brake apparatus 1 viewed in the axial direction of the master cylinder 4.

If the master cylinder 4 is disposed so that the axis thereof extends in the front-back direction of the vehicle, the master cylinder 4 and the stroke simulator valve 6 can be situated to overlap each other as viewed from the perpendicular direction. This reduces the occupation area of the brake apparatus 1 viewed from above. It is only required that there is a range in which the master cylinder 4 and the stroke simulator valve 6 partially overlap each other when vertically projected. Preferably, however, a half or more than half of the stroke simulator valve 6 overlaps the master cylinder 4. According to the embodiment, the area in which the master cylinder 4 and the stroke simulator valve 6 overlap each other in the vertical direction reaches its largest value, and the vertical projected area reaches the smallest value, thereby enhancing the foregoing effects.

As illustrated in FIG. 4, the stroke simulator valve 6 is fit in an outline of the master cylinder 4 (master cylinder housing 40) as viewed in the z-axis direction. The x-axis positive-side end of the stroke simulator valve 6 (connector portion 610) is located substantially in the same position as the x-axis positive-side ends of the reservoir tank 3 and the master cylinder 4 on the x-axis. This makes it possible to make the vertical projected area of the brake apparatus 1 as small as possible.

In the stroke simulator housing 50, the housing of the stroke simulator valve 6 and that of the stroke simulator 5 are integrally formed, so that the entire brake apparatus 1 is downsized and improved in mountability on the vehicle. Furthermore, the structure and brake pipes for connecting the stroke simulator 5 and the stroke simulator valve 6 are unnecessary, so that the brake apparatus 1 is simplified in configuration and improved in mounting workability and fail-safety at the same time.

The controller 8b that controls the stroke simulator valve 6 is formed independently of the brake apparatus 1 and connected through the harness to the stroke simulator valve 6. As compared to when the brake apparatus 1 and the controller 8b are integrally provided, the brake apparatus 1 is downsized and therefore increased in the degree of freedom in placement. To put it differently, the degree of freedom in placement of the brake apparatus 1 can be increased by integrating the hydraulic-pressure controller for controlling the wheel-cylinder hydraulic pressure and the controller that controls the stroke simulator valve 6 into the controller 8b.

The master cylinder 4, the stroke simulator 5, and the stroke simulator valve 6 are formed to fit in the width (y-axis dimension) of the flange portion 50c for attaching the brake apparatus 1 (stroke simulator housing 50) to the vehicle. It is then possible to downsize the brake apparatus 1 viewed in the traverse direction of the vehicle (namely, direction orthogonal to the axes of the master cylinder 4 and the stroke simulator valve 6 as viewed from above). This further improves the mountability of the brake apparatus 1 in the vehicle and thus saves space in the engine room. For example, the brake apparatus 1 can be installed to substantially fit in the space required for installation of a master back (space created by omitting the master back), as viewed in the front-back direction of the vehicle. This decreases the need to separately prepare a space for installing the brake apparatus 1.

The brake pipe 71 connecting the reservoir tank 3 to the stroke simulator 5 is installed to fit in the width (y-axis dimension) of the flange portion 50c. It is then possible to downsize the brake apparatus 1 viewed in the traverse direction of the vehicle and further improve the mountability of the brake apparatus 1 in the vehicle.

More specifically, the fastening portion 40*d* of the master cylinder housing 40 and the fastening portion 50*i* of the stroke simulator housing 50 protrude in the positive direction of the y-axis and yet fit in the width (y-axis dimension) of the flange portion 50*c*. The pipe attachment portions 320*a* and 580 are situated in spaces above and below the fastening portions 40*d* and 50*i*. The pipe attachment portions 320*a* and 580 are bent to open in the positive direction of the x-axis (not in the positive direction of the y-axis) and fit in the width (y-axis dimension) of the flange portion 50*c*. The brake pipe 71 attached to the pipe attachment portions 320*a* and 580 is installed in a shape of the letter U which extends around the fastening portions 40*d* and 50*i* and the discharge port 44P. The brake pipe 71 fits in the width (y-axis dimension) of the flange portion 50*c* without interference with the fastening portions 40*d*, etc. Since the brake pipe 71 is installed so as not to outwardly protrude beyond the flange portion 50*c* in the width direction, interference of the brake pipe 71 and the other members in the engine room can be avoided. It is also possible to suppress damage of the brake pipe 71 and improve the mountability of the brake apparatus 1 in the vehicle. Particularly if the brake pipe 71 is made of a flexible material (such as rubber), damage thereon can be effectively suppressed.

The stroke simulator 5 is situated under the master cylinder 4, and the reservoir tank 3 on the master cylinder 4 (the reservoir tank 3, the master cylinder 4, and the stroke simulator 5 are arranged in the order given from top to bottom when installed in the vehicle). The brake apparatus 1 is therefore improved in air-bleeding performance. That is to say, air (atmosphere) in the brake apparatus 1 is removed when the brake apparatus 1 is attached to the vehicle or maintained (when the brake fluid is exchanged). With respect to a portion of the simulator fluid path, which is located further on the stroke simulator 5 side than the stroke simulator valve 6 (including the main chamber 54), air can be easily removed by the air bleeder 57. The bleeder 57 opens on the z-axis positive side of the main chamber 54 (cylinder portion 50*e*) of the stroke simulator 5, that is, in an upper region where air is likely to accumulate. This improves air bleeding performance. With respect to a portion of the simulator fluid path, which located further on the master cylinder 4 side than the stroke simulator valve 6, air can be removed through the master cylinder 4 (hydraulic chamber 43P) and the reservoir tank 3 (feed opening 30) via the brake pipe 70. The stroke simulator 5 is situated under the master cylinder 4, and the reservoir tank 3 on the master cylinder 4. Air (bubble) then rises due to a buoyant force and is easily removed from the reservoir tank 3 through the brake pipe 70, etc. The air bleeding performance can be improved in this manner.

Effects of Embodiment 1

The invention recognized from Embodiment 1 and effects thereof will be listed below.

(1) There is provided a brake apparatus including:

the master cylinder 4 that generates hydraulic brake pressure by brake operation by a driver; and the stroke simulator 5 creates an artificial operation reaction force of a brake operation member when the brake fluid flown out of the master cylinder 4 enters the stroke simulator 5, wherein:

the master cylinder 4 and the stroke simulator 5 are integrally disposed to overlap each other in the perpendicular direction (as viewed from the perpendicular direction) when installed in the vehicle.

This makes it possible to reduce the projected area of the brake apparatus 1 viewed from above and improve the mountability on the vehicle.

(2) In the brake apparatus, the master cylinder 4 includes the reservoir tank 3 capable of supplying the brake fluid, and the stroke simulator 5 is disposed under or below the master cylinder 4, and the reservoir tank 3 on or above the master cylinder 4.

This improves the air bleeding performance.

(3) In the brake apparatus, the stroke simulator 5 includes the reaction piston 51 (piston) that moves in the axial direction when the brake fluid enters the stroke simulator 5, wherein:

the axial direction of the master cylinder 4 and that of the stroke simulator 5 are aligned in the same direction.

Since both the axial directions are aligned in the same direction, the projected area of the brake apparatus 1 viewed from above can be further reduced.

(4) In the brake apparatus 1, there is provided the stroke simulator valve 6 for limiting the inflow of the brake fluid into the stroke simulator, and the stroke simulator valve is placed coaxially with the stroke simulator.

(5) In the brake apparatus, the stroke simulator valve 6 is disposed to overlap the master cylinder 4 in the perpendicular direction (as viewed from the perpendicular direction).

(6) In the brake apparatus, there is provided the flange portion 50*c* (flange) for fixing the brake apparatus to the vehicle, and the master cylinder 4 and the stroke simulator 5 are configured to fit in the width of the flange portion 50*c*.

The brake apparatus 1 is therefore downsized as viewed in the traverse direction of the vehicle and further improved in mountability on the vehicle.

(7) In the brake apparatus, there are provided:

the reservoir tank 3 that is disposed on the master cylinder and stores the brake fluid; and the brake pipe 71 connecting the reservoir tank to the stroke simulator, and the brake pipe is installed to fit in the width of the flange.

(8) In the brake apparatus, the master cylinder 4 includes the master cylinder housing 40 in which the piston is housed;

the stroke simulator includes the stroke simulator housing 50 in which the piston is housed, which moves in the axial direction in reaction to the inflow of the brake fluid; and the housings are integrally fixed to each other.

(9) There is provided the brake apparatus including:

the master cylinder 4 capable of generating the brake fluid by the piston moving in the axial direction; and the stroke simulator 5 that creates the artificial operation reaction force when the brake fluid flown out of the master cylinder enters the stroke simulator 5 during the brake operation by the driver and causes the reaction piston to move in the axial direction, wherein:

the master cylinder and the stroke simulator are disposed vertically relative to each other with the axial directions thereof aligned with each other when installed in the vehicle.

(10) In the brake apparatus, there is provided the reservoir tank 3 that supplies the brake fluid into the master cylinder, and the reservoir tank, the master cylinder, and the stroke simulator are arranged in the order given from top to bottom when installed in the vehicle.

(11) In the brake apparatus,
there is provided the stroke simulator valve 6 for limiting the inflow of the brake apparatus into the stroke simulator, and
the stroke simulator valve is placed in an axial position of the stroke simulator.
(12) In the brake apparatus,
the stroke simulator valve includes the valve element 640 that operates in the axial direction, and is disposed so that the operating direction of the valve element and the moving direction of the reaction piston are the same.
(13) In the brake apparatus,
the master cylinder includes the master cylinder housing in which the piston is housed, and
the stroke simulator includes the stroke simulator housing in which the reaction piston is housed.
(14) In the brake apparatus,
the master cylinder housing and the stroke simulator housing include joint surfaces at which the housings are integrally fixed together, and
the joint surfaces include socket portions.
(15) In the brake apparatus,
the stroke simulator housing includes the fixed flange for fixing the stroke simulator housing to the vehicle, and
the master cylinder and the stroke simulator are configured to fit in the width of the fixed flange.
(16) In the brake apparatus,
there is provided the brake pipe connecting the reservoir tank that stores the brake fluid to the stroke simulator, and the brake pipe is installed to fit in the width of the fixed flange.
(17) There is provided the brake system including:
the actuator 8 that controls the wheel-cylinder hydraulic pressure according to the brake operation or vehicle condition; and
the brake apparatus 1 that is disposed independently of the actuator 8 and operates according to the brake operation by the driver, wherein:
the brake apparatus 1 includes the master cylinder 4 that generates the hydraulic brake pressure through the brake operation by the driver;
the stroke simulator 5 that creates the artificial operation reaction force of the brake operation member when the brake fluid flown out of the master cylinder 4 enters the stroke simulator 5;
the stroke simulator valve 6 for limiting the inflow of the brake fluid into the stroke simulator 5; and
the controller 8b that controls the stroke simulator valve 6, wherein:
the master cylinder 4 and the stroke simulator 5 are integrally arranged to overlap each other in the perpendicular direction (as viewed from the perpendicular direction) when installed in the vehicle; and
the controller 8b is configured independently of the master cylinder 4, and connected to the stroke simulator valve 6 through the harness.
This makes it possible to obtain the same effects as those described in the (1). Since the controller 8b is provided independently of the master cylinder 4, the brake apparatus 1 is downsized and improved in the degree of freedom in placement.
(18) In the brake system,
the actuator includes the hydraulic-pressure controller for controlling the wheel-cylinder hydraulic pressure, and
the controller is included in the hydraulic-pressure controller.
(19) In the brake system,
the master cylinder includes the master cylinder housing in which the piston is housed, and
the stroke simulator includes the stroke simulator housing in which the reaction piston is housed.
(20) In the brake system,
the stroke simulator includes the piston that moves in the axial direction in reaction to the inflow of the brake fluid, and
the axial direction of the master cylinder and that of the stroke simulator are aligned in the same direction.

Other Embodiments

The embodiments for carrying out the invention have been described on the basis of exemplary embodiments. The specific configuration of the invention, however, is not limited to the embodiments. The invention may be modified or improved without deviating from the gist thereof, and includes equivalents thereto. For example, the master cylinder and the stroke simulator may be formed using a common housing. The master cylinder and the stroke simulator may be arranged not integrally with each other but independently of each other (for example, spatially close to but separated from each other). In the foregoing cases, too, the mountability on the vehicle can be improved if the master cylinder and the stroke simulator are arranged to overlap each other as viewed from the perpendicular direction when installed in the vehicle. As illustrated in FIG. 9, a spring (such as a disc spring) 23 functioning as a damper may be placed between the x-axis negative-side end of the master cylinder housing 40 (fitting portion 40c) and the flange portion 21 of the pushrod 2 (in the outer periphery of the piston 41P). When the amount of operation of the brake pedal reaches equal to or more than a predetermined value, the flange portion 21 comes into contact with the x-axis negative-side end of the spring 23, and the spring 23 is compressed by the flange portion 21 from the negative side of the x-axis. The spring 23 that is brought into compressive deformation applies a reaction force to the brake pedal through the pushrod 2, thereby adjusting the brake operation force. Therefore, preferable characteristics can be exerted in all regions of the amount of operation of the brake pedal. For example, here is an assumption that a link-type boosting device using a link mechanism is installed between the brake pedal and the device 20, instead of using the actuator 8 as a boosting device. If the link mechanism is provided with characteristics that enable a predetermined boosting performance under a limited condition at the installation in the vehicle, this might cause a situation in which a lever ratio is excessively increased in a pedal stroke region at a later stage of the brake operation, or the like, so that there is the possibility that preferable braking characteristics (relation between pedal pressure, strokes, and deceleration) cannot be obtained. With the spring 23, since the spring 23 is compressed at the later stage of the brake operation, which increases the pedal reaction force and decreases the pedal pressure. This provides preferable braking characteristics in all regions of the amount of operation of the brake pedal.

The foregoing descriptions are related only to several embodiments of the invention. It should be easily understandable by a person skilled in the art that the embodiments illustrated above may be modified or improved in various ways without substantial deviation from the new teachings and advantages of the invention. It is therefore intended that any embodiments added with such modification or improvement are included in the technical scope of the invention.

The present application claims priority under Japanese Patent Application No. 2013-109634 filed on May 24, 2013. The entire disclosure of Japanese Patent Application No. 2013-109634 filed on May 24, 2013, including the description, claims, drawings and abstract, is incorporated herein by reference in its entirety.

REFERENCE SIGNS LIST 1 brake apparatus
3 reservoir tank
4 master cylinder
5 stroke simulator
50c flange portion (flange)
51 reaction piston (piston)
6 stroke simulator valve
8 actuator
8b controller

The invention claimed is:

1. A brake apparatus comprising:
a master cylinder that generates hydraulic brake pressure by a driver's brake operation, the master cylinder including a master cylinder housing; and
a stroke simulator including a stroke simulator housing that is a discrete member formed separately from the master cylinder housing, the stroke simulator configured to create an artificial operation reaction force of a brake operation member when brake fluid which has flowed out of the master cylinder enters the stroke simulator housing,
wherein the stroke simulator housing includes a flange portion, a fixing member fixed to the flange portion, and a stroke simulator body,
wherein the fixing member fixes the flange portion to a vehicle,
wherein the master cylinder housing is mounted to the flange portion above the stroke simulator body,
wherein the master cylinder and the stroke simulator are integrally arranged to overlap each other in a vertical direction when installed in the vehicle,
wherein the master cylinder and the stroke simulator body are configured to fit in a width of the flange portion,
wherein the brake apparatus further comprises
a reservoir tank disposed on or above the master cylinder and structured to store the brake fluid, and
a brake pipe connecting the reservoir tank to the stroke simulator body,
wherein the brake pipe is disposed around an outside of the master cylinder to fit in the width of the flange portion, and
wherein the brake pipe extends from an upper side of the master cylinder to a lower side of the master cylinder.

2. The brake apparatus of claim 1, wherein:
the stroke simulator includes a piston that moves in an axial direction in reaction to inflow of the brake fluid; and
an axial direction of the master cylinder and an axial direction of the stroke simulator are aligned in the same direction.

3. The brake apparatus of claim 2, further comprising:
a stroke simulator valve for limiting the inflow of the brake fluid into the stroke simulator, wherein:
the stroke simulator valve is placed coaxially with the stroke simulator.

4. The brake apparatus of claim 3, wherein:
the stroke simulator valve is placed to overlap the master cylinder in the vertical direction.

5. The brake apparatus of claim 1, wherein:
the master cylinder housing houses a piston;
the stroke simulator housing houses a piston which moves in an axial direction in reaction to inflow of the brake fluid.

6. The brake apparatus of claim 1, wherein:
the master cylinder and the stroke simulator are disposed so that a longitudinal axial line of the master cylinder and a longitudinal axial line of the stroke simulator are parallel to each other.

* * * * *